United States Patent
Wilkinson et al.

(10) Patent No.: US 9,667,589 B2
(45) Date of Patent: May 30, 2017

(54) LOGICAL / PHYSICAL ADDRESS STATE LIFECYCLE MANAGEMENT

(75) Inventors: Mark L. Wilkinson, Austin, TX (US); Ronald J. Miller, Kyle, TX (US); Michael J. McDaniels, Hutto, TX (US)

(73) Assignee: TRUSTWAVE HOLDINGS, INC., Chicago, IL (US)

( * ) Notice: Subject to any disclaimer, the term of this patent is extended or adjusted under 35 U.S.C. 154(b) by 279 days.

(21) Appl. No.: 13/603,388

(22) Filed: Sep. 4, 2012

(65) Prior Publication Data

US 2013/0311676 A1 Nov. 21, 2013

Related U.S. Application Data

(63) Continuation of application No. 10/676,505, filed on Oct. 1, 2003, now Pat. No. 8,260,961.

(Continued)

(51) Int. Cl.
*G06F 15/173* (2006.01)
*G06F 15/16* (2006.01)
(Continued)

(52) U.S. Cl.
CPC .......... *H04L 61/10* (2013.01); *H04L 63/1433* (2013.01); *H04L 29/12028* (2013.01); *H04L 61/103* (2013.01)

(58) Field of Classification Search
CPC ............... H04L 29/08144; H04L 29/06; H04L 29/08072; H04L 29/08171; H04L 12/5695;
(Continued)

(56) References Cited

U.S. PATENT DOCUMENTS 5,455,865 A 10/1995 Perlman
5,557,742 A 9/1996 Smaha et al.
(Continued)

FOREIGN PATENT DOCUMENTS

EP 0160443 11/1985
EP 0493892 7/1992
(Continued)

OTHER PUBLICATIONS

United States Patent and Trademark Office, "Non-final Office Action," issued in connection with U.S. Appl. No. 10/676,505, Jun. 7, 2007, 32 pages.

(Continued)

*Primary Examiner* — Mahran Abu Roumi
(74) *Attorney, Agent, or Firm* — Hanley, Flight & Zimmerman, LLC.

(57) ABSTRACT

A system and method for managing logical and physical address state lifecycles. A state of unknown can be assigned to an address when the state has not been assigned. The state of the address is changed when communication is targeted to the address. The state can be changed to unfulfilled when the communication includes an address resolution protocol request sent to a device having the address when a time limit for a response to the address resolution protocol request has not expired. The state can be changed to virtual when the communication is received at the address when the state of the address is unfulfilled, and a time limit for responding to the communication expires before a response is sent. The state can be changed to unknown when the state of the address is not unknown, and the address does not participate in the communication within a time limit.

19 Claims, 24 Drawing Sheets

Related U.S. Application Data

(60) Provisional application No. 60/415,290, filed on Oct. 1, 2002.

(51) Int. Cl.
*H04L 29/12* (2006.01)
*H04L 29/06* (2006.01)

(58) Field of Classification Search
CPC ........... H04L 29/08756; H04L 29/0809; H04L 29/06068
USPC ........................................................ 709/226
See application file for complete search history.

(56) References Cited

U.S. PATENT DOCUMENTS

| | | | |
|---|---|---|---|
| 5,757,924 | A | 5/1998 | Friedman et al. |
| 5,764,913 | A | 6/1998 | Jancke et al. |
| 5,835,726 | A | 11/1998 | Shwed et al. |
| 5,854,901 | A | 12/1998 | Cole et al. |
| 5,884,025 | A | 3/1999 | Baehr et al. |
| 6,006,016 | A | 12/1999 | Faigon et al. |
| 6,067,297 | A | 5/2000 | Beach |
| 6,078,929 | A | 6/2000 | Rao |
| 6,112,181 | A | 8/2000 | Shear et al. |
| 6,119,236 | A | 9/2000 | Shipley |
| 6,154,839 | A | 11/2000 | Arrow et al. |
| 6,157,721 | A | 12/2000 | Shear et al. |
| 6,185,689 | B1 | 2/2001 | Todd, Sr. et al. |
| 6,212,635 | B1 | 4/2001 | Reardon |
| 6,253,337 | B1 | 6/2001 | Maloney et al. |
| 6,269,447 | B1 | 7/2001 | Maloney et al. |
| 6,272,641 | B1 | 8/2001 | Ji |
| 6,278,966 | B1 | 8/2001 | Howard et al. |
| 6,282,546 | B1 | 8/2001 | Gleichauf et al. |
| 6,283,770 | B1 | 9/2001 | Leung et al. |
| 6,298,445 | B1 | 10/2001 | Shostack et al. |
| 6,301,668 | B1 | 10/2001 | Gleichauf et al. |
| 6,304,262 | B1 | 10/2001 | Maloney et al. |
| 6,304,975 | B1 | 10/2001 | Shipley |
| 6,321,336 | B1 | 11/2001 | Applegate et al. |
| 6,321,338 | B1 | 11/2001 | Porras et al. |
| 6,324,177 | B1 | 11/2001 | Howes et al. |
| 6,324,656 | B1 | 11/2001 | Gleichauf et al. |
| 6,330,588 | B1 | 12/2001 | Freeman |
| 6,343,138 | B1 | 1/2002 | Rhoads |
| 6,363,489 | B1 * | 3/2002 | Comay ............... H04L 63/1416 709/224 |
| 6,405,318 | B1 * | 6/2002 | Rowland ............... G06F 21/552 726/22 |
| 6,453,345 | B2 | 9/2002 | Trcka et al. |
| 6,697,103 | B1 | 2/2004 | Fernandez et al. |
| 6,715,084 | B2 | 3/2004 | Aaron et al. |
| 6,725,378 | B1 | 4/2004 | Schuba et al. |
| 6,735,202 | B1 | 5/2004 | Ahmed et al. |
| 6,745,333 | B1 | 6/2004 | Thomsen |
| 6,772,349 | B1 | 8/2004 | Martin et al. |
| 6,792,319 | B1 | 9/2004 | Bilger |
| 6,904,020 | B1 | 6/2005 | Love et al. |
| 6,907,525 | B2 | 6/2005 | Pazi et al. |
| 6,957,276 | B1 | 10/2005 | Bahl |
| 6,983,317 | B1 | 1/2006 | Bishop et al. |
| 6,999,418 | B2 | 2/2006 | Sharma et al. |
| 7,073,198 | B1 * | 7/2006 | Flowers ............... H04L 63/1433 713/151 |
| 7,234,163 | B1 * | 6/2007 | Rayes ............... H04L 29/12009 713/154 |
| 2001/0017857 | A1 | 8/2001 | Matsukawa |
| 2001/0039579 | A1 | 11/2001 | Trcka et al. |
| 2001/0039624 | A1 | 11/2001 | Kellum |
| 2001/0042213 | A1 | 11/2001 | Jemes et al. |
| 2002/0010869 | A1 | 1/2002 | Kim |
| 2002/0066034 | A1 * | 5/2002 | Schlossberg ............ G06F 21/552 726/23 |
| 2002/0073338 | A1 | 6/2002 | Burrows et al. |
| 2002/0107953 | A1 | 8/2002 | Ontiveros et al. |
| 2003/0051014 | A1 | 3/2003 | Gluska et al. |
| 2003/0051026 | A1 | 3/2003 | Carter et al. |
| 2003/0101353 | A1 * | 5/2003 | Tarquini ............... H04L 63/1408 726/23 |
| 2003/0135762 | A1 | 7/2003 | Macaulay |
| 2003/0145226 | A1 | 7/2003 | Bruton, III et al. |
| 2003/0182580 | A1 | 9/2003 | Lee |
| 2004/0044912 | A1 * | 3/2004 | Connary ............... H04L 43/045 726/23 |
| 2004/0064737 | A1 * | 4/2004 | Milliken ............... G06F 21/562 726/23 |
| 2004/0093521 | A1 | 5/2004 | Hamadeh et al. |
| 2004/0172557 | A1 | 9/2004 | Nakae et al. |
| 2005/0018618 | A1 | 1/2005 | Mualem et al. |
| 2005/0111447 | A1 | 5/2005 | Soukup |
| 2005/0177717 | A1 | 8/2005 | Grosse |
| 2005/0177871 | A1 | 8/2005 | Roesch et al. |
| 2005/0198374 | A1 | 9/2005 | Suzuki |
| 2005/0204171 | A1 | 9/2005 | Belenky et al. |
| 2005/0210533 | A1 | 9/2005 | Copeland et al. |
| 2005/0210534 | A1 | 9/2005 | Krishnamurthy |
| 2009/0044277 | A1 * | 2/2009 | Aaron ................. H04L 63/1433 726/25 |

FOREIGN PATENT DOCUMENTS

| | | |
|---|---|---|
| EP | 0985995 | 3/2000 |
| GB | 2362076 | 11/2001 |
| WO | 9700471 | 1/1997 |
| WO | 0031963 | 6/2000 |
| WO | 0062167 | 10/2000 |
| WO | 0184285 | 11/2001 |
| WO | 0211399 | 2/2002 |

OTHER PUBLICATIONS

United States Patent and Trademark Office, "Final Office Action," issued in connection with U.S. Appl. No. 10/676,505, Mar. 19, 2008, 29 pages.

United States Patent and Trademark Office, "Notice of Allowance," issued in connection with U.S. Appl. No. 10/676,505, Apr. 27, 2012, 42 pages.

United States Patent and Trademark Office, "Non-final Office Action," issued in connection with U.S. Appl. No. 10/676,541, Feb. 23, 2007, 11 pages.

United States Patent and Trademark Office, "Final Office Action," issued in connection with U.S. Appl. No. 10/676,541, Aug. 8, 2007, 12 pages.

United States Patent and Trademark Office, "Non-final Office Action," issued in connection with U.S. Appl. No. 10/676,541, Jul. 29, 2008, 15 pages.

United States Patent and Trademark Office, "Notice of Allowance," issued in connection with U.S. Appl. No. 10/676,541, Oct. 30, 2008, 5 pages.

United States Patent and Trademark Office, "Non-final Office Action," issued in connection with U.S. Appl. No. 10/676,709, Feb. 26, 2007, 8 pages.

United States Patent and Trademark Office, "Final Office Action," issued in connection with U.S. Appl. No. 10/676,709, Aug. 15, 2007, 11 pages.

* cited by examiner

| SIP | DIP | SMAC | TIME |
|---|---|---|---|
| 183.76.0.7 | 192.82.0.1 | 00-0S-21-C9-3a-C0 | 00:00:00.000 |

| SIP | DIP | SMAC | TIME | RULE |
|---|---|---|---|---|
| 183.76.0.7 | 192.82.0.1 | 00-08-21-C9-3e-C0 | 00:00:00.000 | 5 |

|   IP        | STATE |
|-------------|-------|
| 192.82.0.1  | 1     |
| 192.82.0.2  | 4     |
| 183.76.0.7  | 3     |

FIGURE 17

|        | DESTINATION | |
|--------|------|----------|
|        | USED | NOT USED |
| SOURCE USED |  |  |
| SOURCE NOT USED |  |  |

FIGURE 18

LOGICAL / PHYSICAL ADDRESS STATE LIFECYCLE MANAGEMENT

CROSS REFERENCE TO RELATED APPLICATIONS

This application claims the benefit of priority based on U.S. Provisional Patent Application Ser. No. 60/415,290, filed Oct. 1, 2002, entitled "System and Method for Detecting and Managing Network Intrusion," and naming Mark L. Wilkinson, Ronald J. Miller, and Michael J. McDaniels as the inventors and based on U.S. patent application Ser. No. 10/676,505 issued as U.S. Pat. No. 8,260,961, entitled "Logical/Physical Address State Lifecycle Management," and naming Mark L. Wilkinson, Ronald J. Miller, and Michael J. McDaniels as the inventors. The above-referenced applications are hereby incorporated by reference herein in its entirety.

This application is related to U.S. patent application Ser. No. 10/262,321, filed Oct. 1, 2002, entitled "System and Method for Managing Network Communications," and naming Mark L. Wilkinson, Ronald J. Miller, and Michael J. McDaniels as the inventors. The above-referenced application is hereby incorporated by reference herein in its entirety.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

FIELD OF INVENTION

This invention, in general, relates to a system and method for managing the lifecycle of logical and physical addresses. More specifically, this invention relates to initializing an address state to unknown when the address state is not defined and changing the address state when a communication is targeted to the address.

BACKGROUND OF THE INVENTION

Global networking of computers has greatly impacted business. As the number of computers linked to networks grows, businesses increasingly rely on networks to interact. More and more people use email, websites, various file transfer methods, and remote office applications, among others, to facilitate business transactions and perform job related tasks.

These applications and uses still rely on early network addressing technologies and flow control protocols to transmit data packets across networks. For example, the Internet Protocol (IP) is an addressing protocol for referencing remote devices on a network. The protocol is implemented to include a packet header that contains bits representing an address of the source, an address of the target, and various other parameters associated with the packet. The Address Resolution Protocol (ARP) is used to reconcile physical addresses on local segments of a network with IP addresses. Other protocols are used for flow control including TCP and UDP. These protocols may be used to control the flow of packets across a network including subdividing and reassembling the packets. TCP also includes methods for: verifying the arrival of a packet. Other protocols include ICMP, IPX, SPX, NetBios, and ARP, among others. Historically, these protocols were designed for use on a trusted network and as such do not include many security features. To address this problem, newer protocols are designed to include some security measures. However, at present, the global Internet and many local area networks predominantly use older protocols with various vulnerabilities.

Hackers and malfeasants take advantage of the weaknesses in these protocols to disrupt, infiltrate, or destroy networked devices. These attacks include worms, viruses, denial-of-service, and infiltration attacks, among others. Worms are self-replicating programs that infect computers. In some cases, these worms take advantage of the trusting relationships between computers to infiltrate network and send network data to the attacker. Viruses infect files and utilize vulnerabilities of programs that interpret the files to propagate. A virus may also function to erase data. Denial-of-services (DoS) attacks often limit the network activity of a target computer by inundating the target with requests or messages. In one example, an attacking computer or set of computers may send a plethora of low level pings to the target device. If the pings include a non-existent return address, the target machine could send a response message and pause over a timeout period for a response. In attempting to respond to the pings, the machine effectively denies network access to other applications.

Infiltrating attacks often circumvent password security and gain access to files. Once the attacker has access, they may steal private information such as credit card or social security numbers. Moreover, they may damage valuable data, install a worm or spying program, or install programs to utilize computational capacity.

The FBI reports that millions of dollars are lost each year as a result of these attacks. In the "2002 Computer Crimes and Security Survey," as much as 90% of the Fortune 2000 companies reported breaches in computer security. According to the survey, each successful attack cost corporations an average of $2.1 Million. The losses include lost data, employee time used in recovering data, delays in existing projects, and damage to equipment. Fifty five percent of the companies surveys reported denial-of-service attacks, 70% reported infiltration and vandalism attacks, and twelve percent reported theft of transaction information.

Hackers use various tools and methodologies to discover vulnerable devices and interact with them. These tools include address scanners, port scanners, worms, and packet formulation programs, among others. For example, a hacker may send reconnaissance packets to a local network segment in search of a computer or device. Once a device is found, the hacker may scan the ports on the device in search of a vulnerable port.

Several approaches exist for protection against hackers. Typically, these protections are defensive shield-like methods. The most common are firewalls, intrusion detection systems (IDS), and anti-virus software. Firewalls are devices typically placed as shields between a local network and the global network. Firewalls are the most common form of network protection. They perform their function by limiting communication between the local network and global network in accordance with various filters and rules. Typically, network traffic is either blocked or permitted based on rules regarding protocols, addressing, and port number. These filters are infrequently changed and can unintentionally encumber certain permissible network traffic while permitting unwanted traffic.

Intrusion detection systems detect intrusions or attacks and report these attacks to network security. The systems predominantly use packet signatures to evaluate network packets. However, these systems have been shown to be unreliable as they can generate false positive results. Often, the systems collapse under the weight of the data they collect. Further, these systems may not detect packets with signatures that are not found in their signature database, resulting in false negatives as well. Moreover, these systems often present the data to network security in a format that prevents timely response to threats.

Similarly, anti-virus software typically relies on file signatures to detect viruses. As such, frequent updates are required to maintain a current database of virus signatures. If an undocumented virus enters the network, the anti-virus software will likely fail.

Many network security systems suffer from deficiencies in detecting and preventing attacks on a network. Many other problems and disadvantages of the prior art will become apparent to one skilled in the art of networks security systems after comparing such prior art with the present invention as described herein.

SUMMARY OF THE INVENTION

Aspects of the invention may be found in a system, method, and computer-readable medium for managing logical and physical address state lifecycles. The method can include assigning a respective state of unknown to a first address of multiple addresses when the respective state of the first address has not been assigned. The method further includes changing the respective state of the first address when a communication is targeted to the first address. The addresses can include all valid logical addresses for a corresponding set of devices on a segment of a network, or all valid physical addresses for a corresponding set of devices on a segment of a network.

The respective state of the first address can be changed to used when the communication indicates that the first address corresponds to a device in use. The respective state of the first address can be changed to unfulfilled when the communication includes an address resolution protocol request sent to a device having the first address when a time limit for a response to the address resolution protocol request has not expired. The respective state of the first address can be changed to omitted when the first address corresponds to a device, and communication with the device is omitted from being observed. In addition, the respective state of the first address can be changed to omitted when the respective state of the first address is programmed to be omitted from the changing.

The respective state of the first address can be changed to virtual when the communication is received at the first address when the respective state of the first address is unfulfilled, and a time limit for responding to the communication expires before a response is sent by the first address. The respective state of the first address 9 can be changed to unknown when the respective state of the first address is not unknown, and the first address does not participate in the communication within a time limit. The respective state of the first address can be changed to automatic when an automatic reply is programmed to be sent to a second address when the first address receives a packet from the second address.

Additional aspects of the invention may be found in a system for managing logical and physical address state lifecycles. The system may be a computational device including a processor or network interface and memory or computer-readable medium, among others. The device may or may not include a user interface. Further, the device may have various data and instructions associated with various methods for managing logical and physical address state lifecycles. These data may include an ARP request queue, an IP state table, a frequency table, an ARP table, a watch list, a threat list, a synthetic physical address table, and a communications stream table, among others. The device may also include packet instructions for evaluating reconnaissance rules, behavioral rules and other rules, among others. Further, the system may include software or computer interpretable instructions for performing various methods associated with maintaining the data in the tables and collecting the data for the tables.

As such, a system, method and computer-readable medium for managing logical and physical address state lifecycles are described. Other aspects, advantages and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 17 is a schematic depicting an IP state table for use in the methods as seen in FIGS. 5-11;

FIG. 18 is a schematic diagram depicting a table for use in the method as seen in FIGS. 5-11;

DETAILED DESCRIPTION

In attempting to contact and infiltrate networks, attackers or programs implemented by the attackers act with characteristic behaviors to determine the address of computers on local segments and communicate with them. These behaviors may be used, separately, or in combination with packet signatures and filters, to identify the attackers as threats. Once identified, communication between the network and the attacker may be controlled, preventing further damage. One method is to deceive the attacker, preventing them from either perceiving the existence of a machine or redirecting their communication to an alternative device such as a security device or sacrificial computer.

Figure 1:
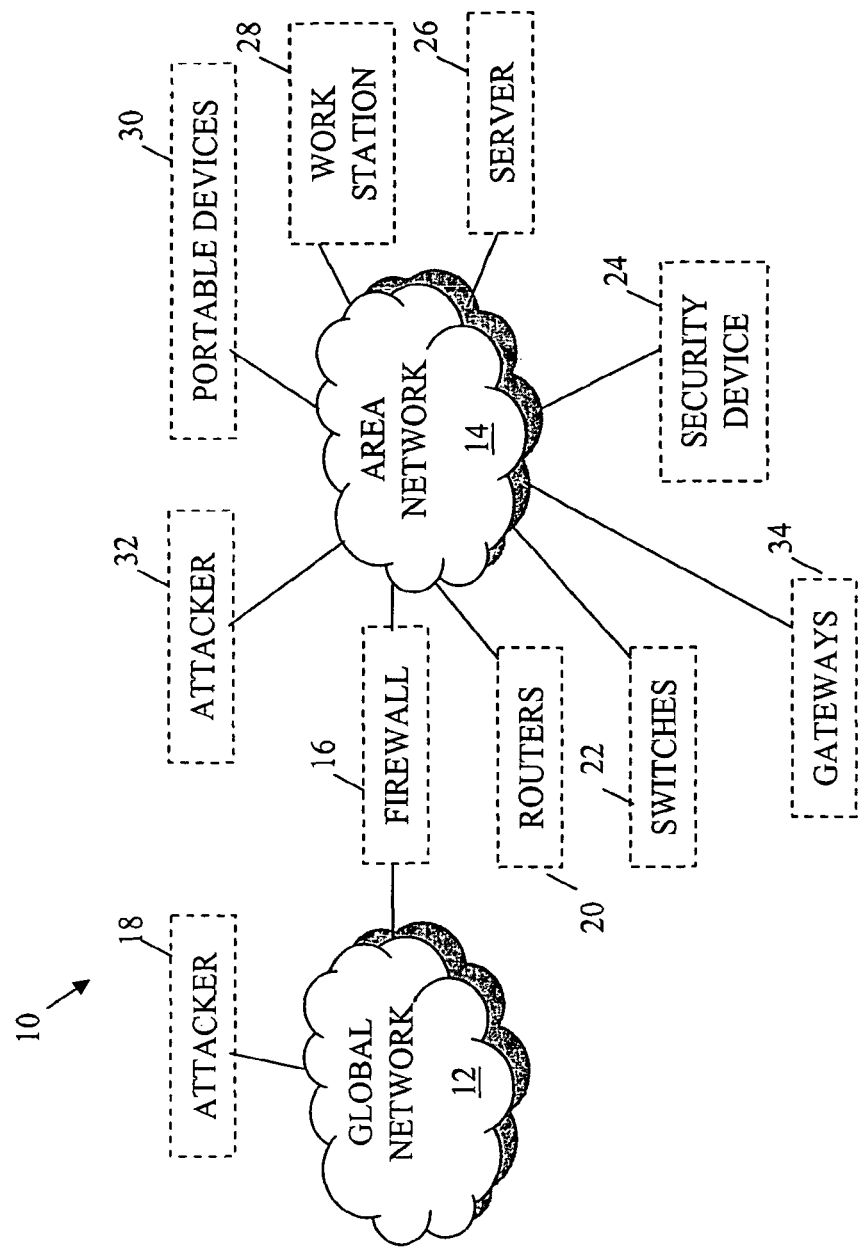
FIG. 1 is a schematic block diagram depicting a network and network devices according to the invention.

FIG. 1 is a schematic block diagram depicting a network according to the invention. An area network 14 is connected to a global network 12. A firewall 16 may or may not be placed between the global network 12 and the area network 14. Connected to the area network 14 may be routers 20, switches 22, security devices 24, servers 26, workstations 28, portable devices 30, and gateway devices 34, among others. The network 14 has either a security device 24 or some other computational device that acts to detect attacks on the area network 14 and mask other devices attached to the area network 14 from the attacker. The attacker may be an attacker 18 connected to the global network 12 or an attacker 32 connected to the area network 14. However, these components may or may not be included in the system, and may be together, separate, or in various combinations, among others.

The global network 12 may take various forms and may communicate with various protocols including IP, TCP, UDP, ICMP, HTTP, and FTP, among others.

Area network 14 may take various forms including Ethernet, Wireless Ethernet, Token rings, Apple Talk, or various combinations of these, among others. In one exemplary embodiment, the area network 14 may be an Ethernet network that resolves logical and physical network addresses using an address resolution protocol (ARP). The ARP resolves the addresses between Internet Protocol (IP) addresses and physical address such as media access control (MAC) addresses.

The security device 24 or some other computational device such as a server 26, workstation 28, routers 20, switches 22, or gateways 34, among others, may function to detect attacks on the area network 14. Singly or in combination these devices may hold and compile a list of devices, MAC addresses, or source IP addresses of devices that represent a threat to the system. Using this list, the device or devices may capture packets, compare the MAC address, source W address, or target IP address, with known threats to the system, and take steps to control or prevent communication with vulnerable devices.

For example, the device may create ARP packets with synthetic hardware addresses associated with the IP addresses of either local devices or attacking devices. In this manner, the ARP tables may be altered, causing packets to be sent across the network to physical addresses other than those targeted by the communication.

For example, the synthetic hardware addresses may be MAC addresses that are not in use by devices on the area network 14. Alternately, the synthetic hardware address may be the address of a sacrificial computer, defense system or security system, among others.

Figure 2:
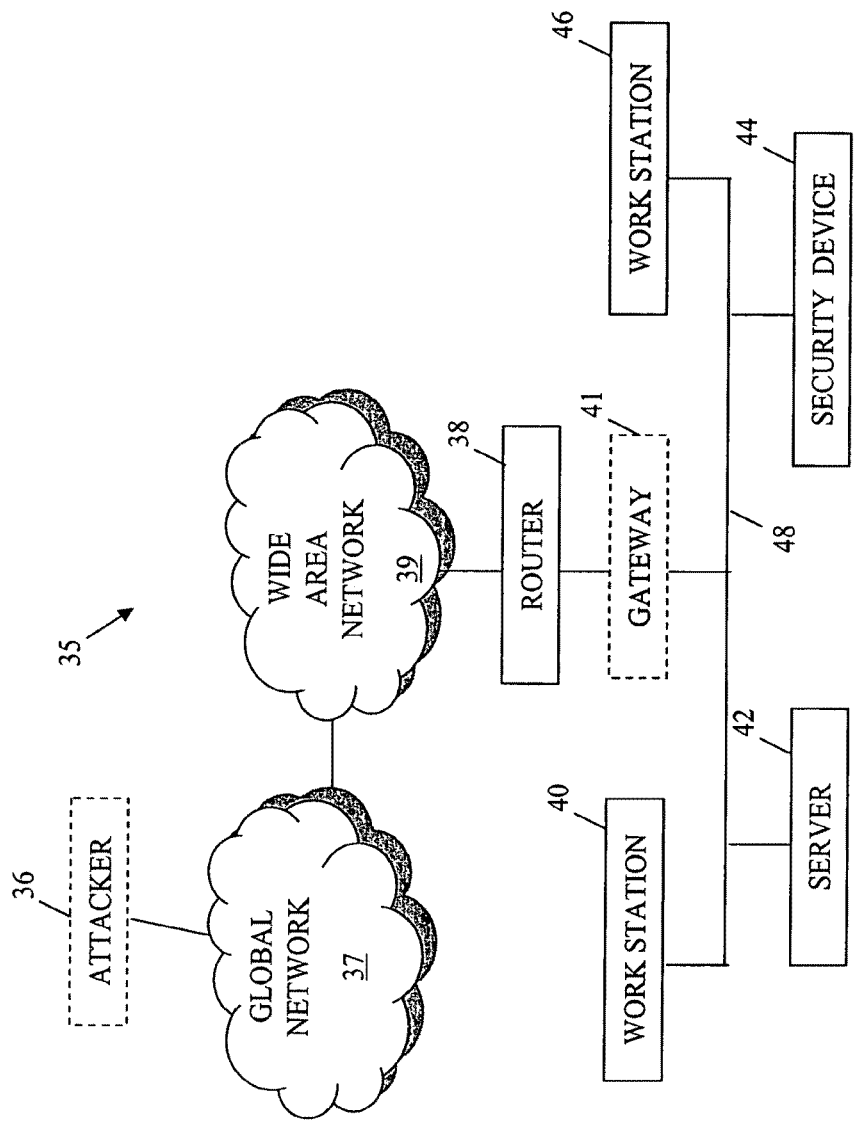
FIG. 2 is a schematic block diagram depicting an exemplary embodiment of a network as seen in FIG. 1.

FIG. 2 is a schematic block diagram depicting an exemplary embodiment of the system as seen in FIG. 1. The router 38 may or may not be connected to the global network 37 through a wide area network 39: The router 38 routes traffic from the global network 37 or wide area network 39 to various devices on a local area network or a local segment of a network 48. The devices on the segment may include workstations 40 and 46, a server 42, a gateway 41, and a security device 44. However, various embodiments of network segments may be envisaged.

In this exemplary embodiment, attacker 36 may send network packets through a global network 37 to router 38. Router 38 may then forward the network packet to the local network 48 where the addressed device receives the communication. Security device 44 may capture these packets, determine whether the packets were sent by an IP address of a device of interest or that represents a threat, and act to control communications between the attacker 36 and the devices on the local segment 48.

In one exemplary embodiment, a security device 44 may detect an attack on the local segment 48. The device may then create ARP packets that include a synthetic physical address, and send those ARP reply packets to a gateway device or other computational device, effectively altering the ARP table in that device.

Figure 3:
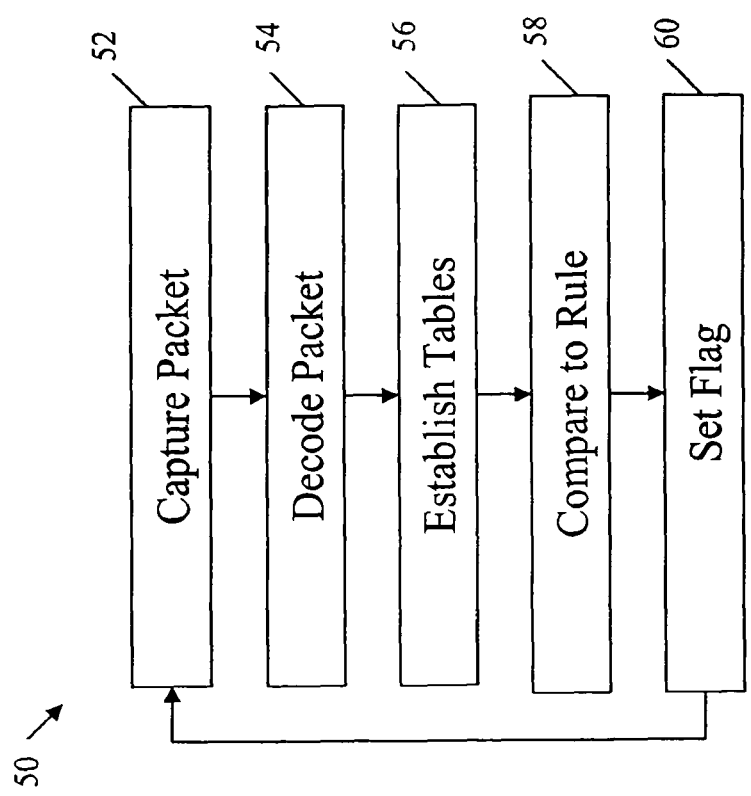
FIG. 3 is a block flow diagram depicting an exemplary method for use by the system as seen in FIG. 1.

FIG. 3 is a block flow diagram depicting a generic method for detecting network incursion. The method includes capturing network packets from the local segment. From these packets tables associated with the state of IP address, the nature of the packets and communications streams may be established. This data may be compared to various rules to determine if an attack is occurring. In the event that an attack is occurring, the system may set a flag or parameter indicating that occurrence and notify personnel or implement a defense mechanism.

Figure 4:
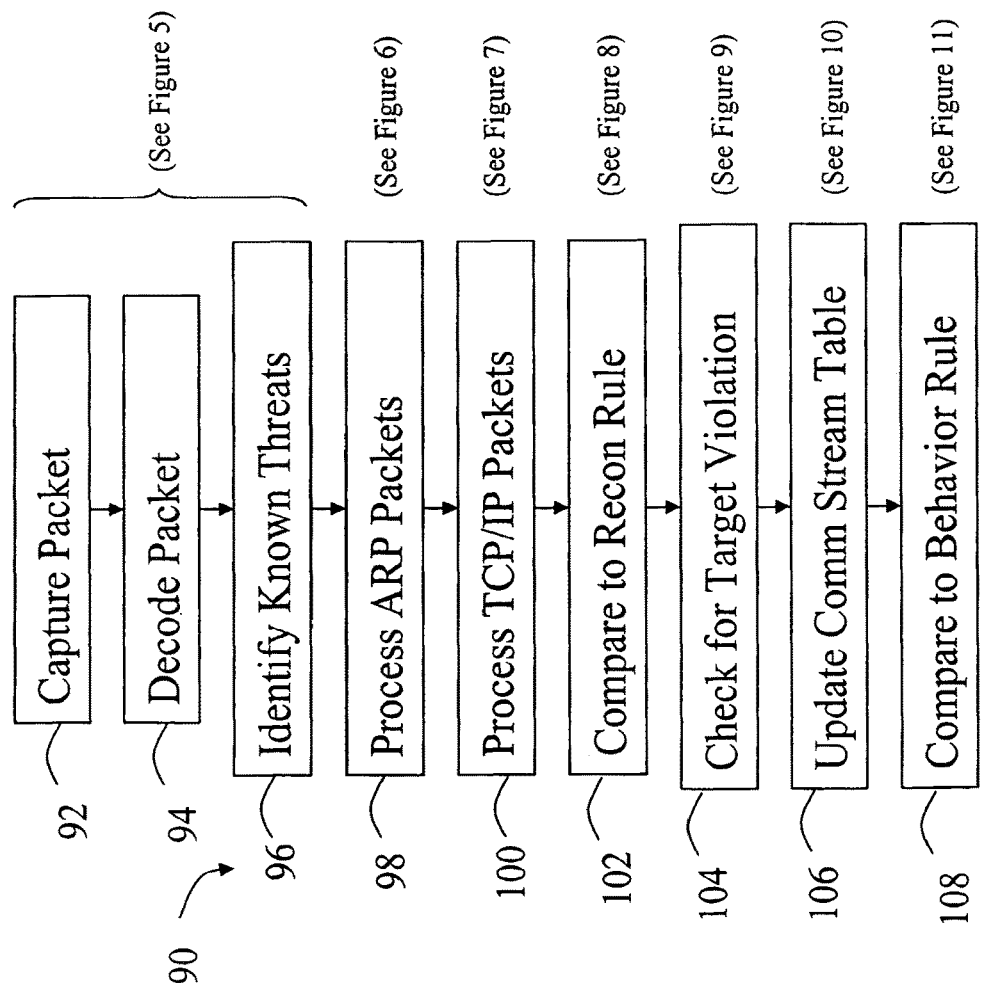
FIG. 4 is a block flow diagram depicting an exemplary method for use by the system as seen in FIG. 1.

Various methods for identifying threats and therefore addresses of devices that represent these threats may be envisaged. One exemplary embodiment is seen in the block flow diagram of FIG. 4.

The method 90 begins with the capturing of a network packet from the local segment as seen in a block 92. This packet may be a network packet comprising data for various protocols including ARP, TCP, IP, HTTP, UDP, or FTP, among others. The method may then decode the packet as seen in a block 94. With the decoded packet, system determines whether the packet represents is of interest or a known threat and may implement a control mechanism such as adjusting an ARP table in response. For example, the system may compare the source or target IP address to a list of known threatening devices. However, alternate methods may be used in determining the threat.

The system may then process various parts of the packet or packet formats in the appropriate manner. For example, the system may process ARP packets as seen in a block 98 and TCP/IP packets as seen in a block 100. However, the method may be configured to process packets using a variety networking and data linking protocols.

The system may then compare the processed information and packet to a set of, reconnaissance rules as seen in a block 102. Multiple reconnaissance rules can be used. For example, determining if the packet strictly conforms to the protocol specification for size and configuration, identifying if the packet flags represent any illegal combinations used to circumvent firewalls, or determining if the packet continues a pattern of packets that cumulatively represents a reconnaissance event. In this manner, the system may determine whether a source computer is behaving in an appropriate manner, and if not, may place the address of the computer on a watch list.

Next, the system may check for target violations as seen in a block 104. These violations may include a packet addressed for an IP address known not to be in use, a packet addressed to a port that is known to be closed, or an ARP request sent to an IP address that does not provide a corresponding reply.

The system may also update or add a communication stream to a communication stream table as seen in 106. The communications stream table may be one or more tables recording information associated with the communications protocol used by the packet, the addresses of the devices associated with the packet, the direction of the packet, and the time of the last packet sent, among others. For example, the system may maintain several tables, each uniquely associated with a communications protocol. These tables may then track interactions with devices on the area network. In this manner, the system may track a communication stream and determine whether systems or devices are behaving appropriately.

As seen in a block 108, the system may compare the behavior of various devices to a set of behavior rules to determine whether a device as represented by its IP address is acting as a trusted device should. For example, a device scanning multiple IP addresses may represent a threat. Or, a device may begin receiving traffic on a port that has historically been closed. Or, the device may initiate communication on ports representing services that are not installed on the device. In all cases, the device would be added to a watch list. A more detailed embodiment of this method may be seen in FIGS. 5-11.

Figure 5:
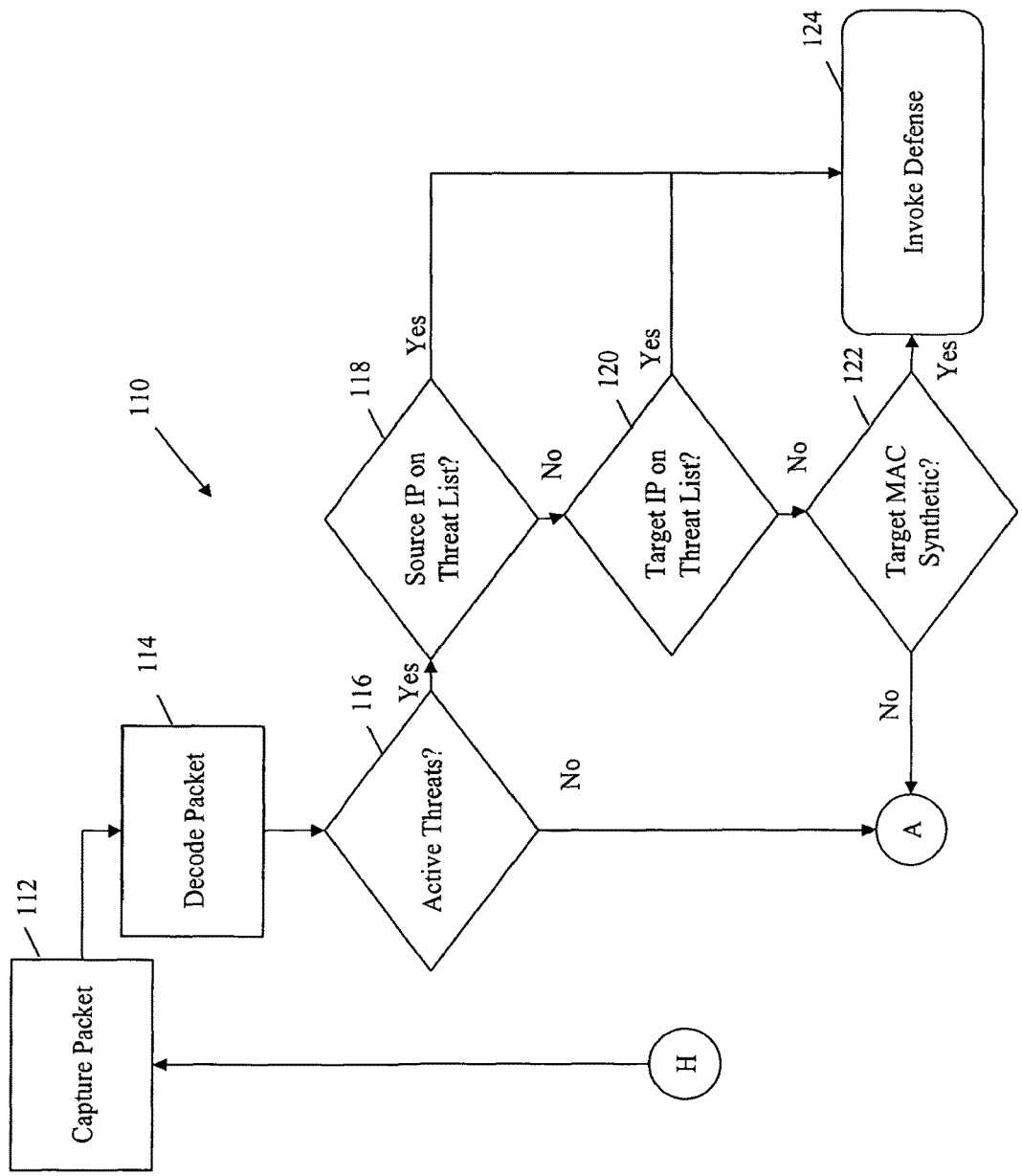
FIG. 5 is a block flow diagram depicting an exemplary method for use by the system as seen in FIG. 1.

As seen in FIG. 5, the system may capture a packet 112 and decode the packet as seen in a block 114. The system may first test to determine whether a threat exists to the system. This test may be implemented as a flag in a data set or a test for IP addresses in a list of known threats, or in various other manners. For example, if a device with an IP address known to be a threat has active communications streams in one or more communications streams tables, the system may change a flag or variable to represent the existence of a threat condition. Over time, if communication from the threatening device ceases, the system may return to a state' of no threat. If no threats exist, then the system may move on to the processing of ARP packets as denoted by a block A.

However, if a threat exists, the system may test the source IP address of the packet as seen in a block 118, the target IP address as seen in a block 120 and the target physical address as seen in a block 122. If the target IP address or source IP address are determined to represent threats, the system may invoke a defense mechanism as seen in block 124. This defense mechanism may include managing communications through MAC layer routing and filtering. Additional defense methods may be seen in FIGS. 25, 26A, and 26B.

To determine whether the addresses represent a threat, the system may compare the addresses to a list of addresses of known threats. Similarly, if the target physical address is synthetic the system may invoke a defense as seen in a block 124. To determine whether the physical address is synthetic, the system may compare the address to a list of known synthetic addresses, or a list of known addresses in use on a local segment. If no threat is found and the physical address is not synthetic the system may continue as seen in a block A.

In an alternate embodiment, the system may determine whether the packet with the synthetic physical address represents a threat. If the packet is non-threatening, the packet may be reformulated and sent to the intended device.

Figure 6:
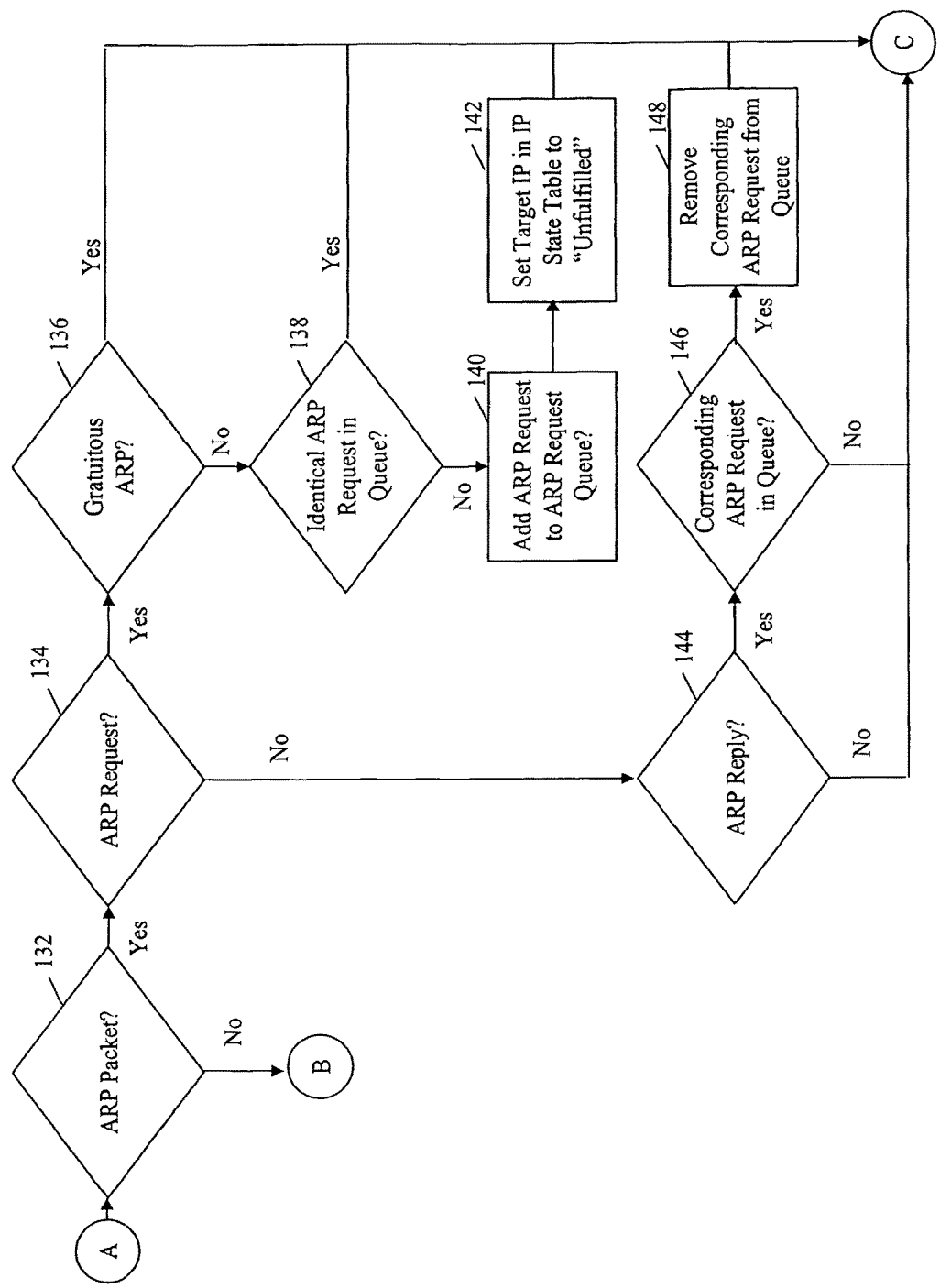
FIG. 6 is a block flow diagram depicting an exemplary method for use by the system as seen in FIG. 1.

FIG. 6 depicts a processing of packets that utilize the address resolution protocol (ARP). The address resolution protocol includes protocols for several message types. Two of the types include requests and replies. Generally, a request from one device has a corresponding reply from another device. A lack of a corresponding relationship may indicate the presence of an attack.

Once the packet is tested for threats or synthetic addresses, it may be tested to determine whether the packet uses ARP. If the packet does not use ARP, a system may move on to the processing of TCP/IP packets. However, if the packet is an ARP packet, the packet may be tested for various types of ARP packets, and processed accordingly. For example, if the packet is an ARP request as seen in a block 184, the packet may be further tested to determine whether the packet is gratuitous as seen in a block 136. A gratuitous ARP request is typically used to announce to a network the presence of a new device and its address. If the packet is a gratuitous ARP, the system may continue on to the processing of TCP/IP packets.

However, if the packet is not gratuitous, the system may test to determine whether an identical ARP request is found in an ARP queue as seen in a block 138. If an identical request is found, the packet may continue on to TCP/IP processing. However, if the packet is not in the queue, the ARP request may be added to the ARP request queue as seen in a block 140, and the state of target IP may be changed to "unfulfilled" in an IP state table. In this manner, state data associated with requests may be stored while waiting for an expected reply.

If the packet is an ARP reply as seen in a block 144, the system may test for a corresponding ARP request in a queue as seen in a block 146 and remove the corresponding ARP request from the queue as seen in a block 148. In each case, the packet may be forwarded for TCP/IP processing as denoted in block C. An exemplary embodiment of an ARP request queue is seen and discussed in relation to FIG. 12. An exemplary embodiment of an IP state table is seen and discussed in relation to FIG. 17.

Figure 7:
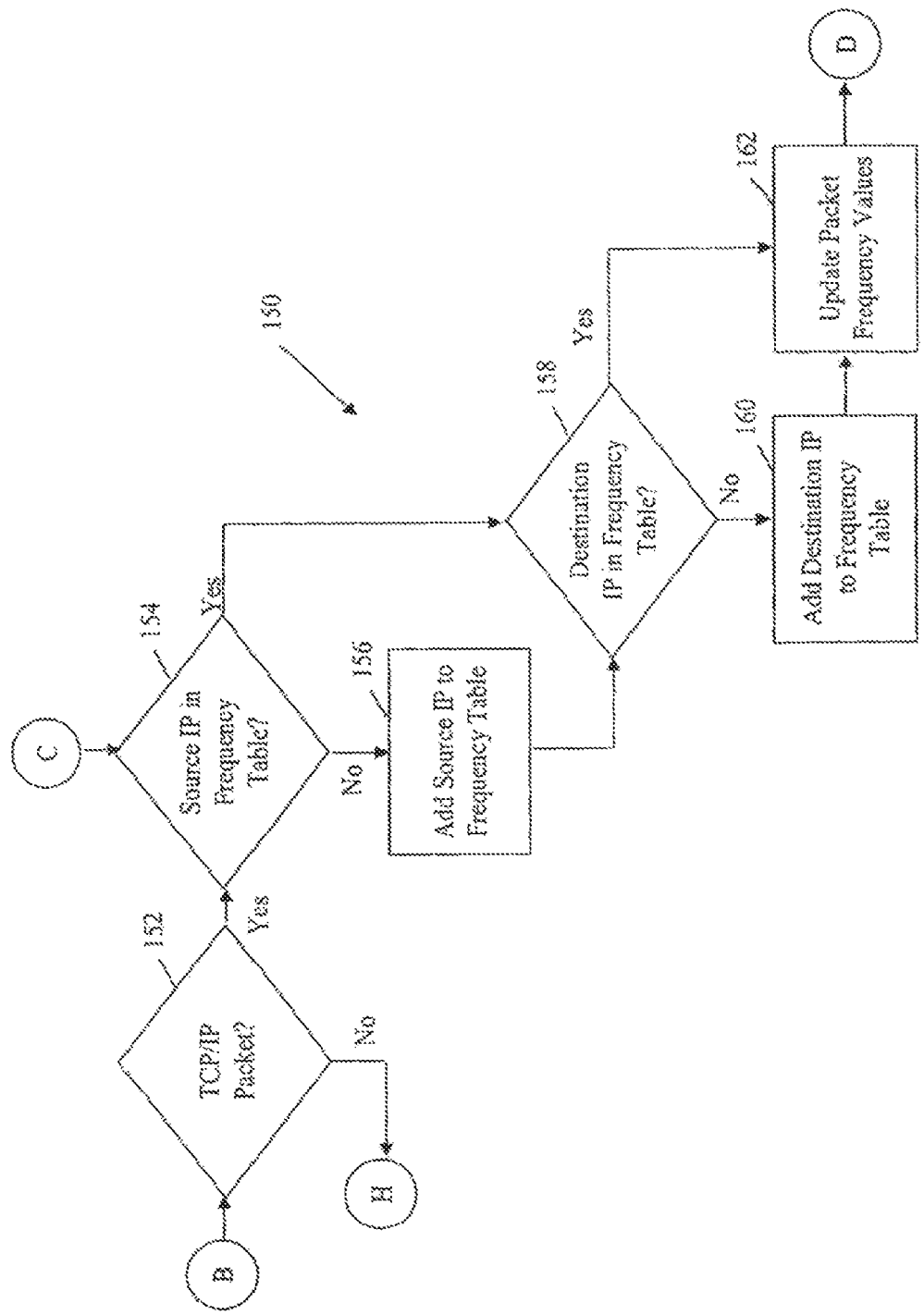
FIG. 7 is a block flow diagram depicting an exemplary method for use by the system as seen in FIG. 1.

Once ARP packets have been processed, or if the packets are determined not to be ARP packets, then they may be forwarded to TCP/IP processing as shown in FIG. 7. The packet may first be tested to determine whether the packet is a TCP/IP packet. If it is not, it may be forwarded to processing under alternate protocols or a subsequent packet may be captured and the method re-started. For example, this may be the case for networks with IPX/SPX communications.

If the packet is a TCP/IP packet, the source IP address is sought in a frequency table as seen in a block 154. If the source IP address is not found in the frequency table it may be added as seen in a block 156. In either case, the system tests the destination IP address to determine whether it is in the frequency table. If the destination IP address is not in the frequency table, it may be added. In either case, the system may update packet frequency values in accordance with the frequency table as seen in a block 162. An exemplary embodiment of a frequency table is seen and discussed in relation to FIG. 16.

Figure 8:
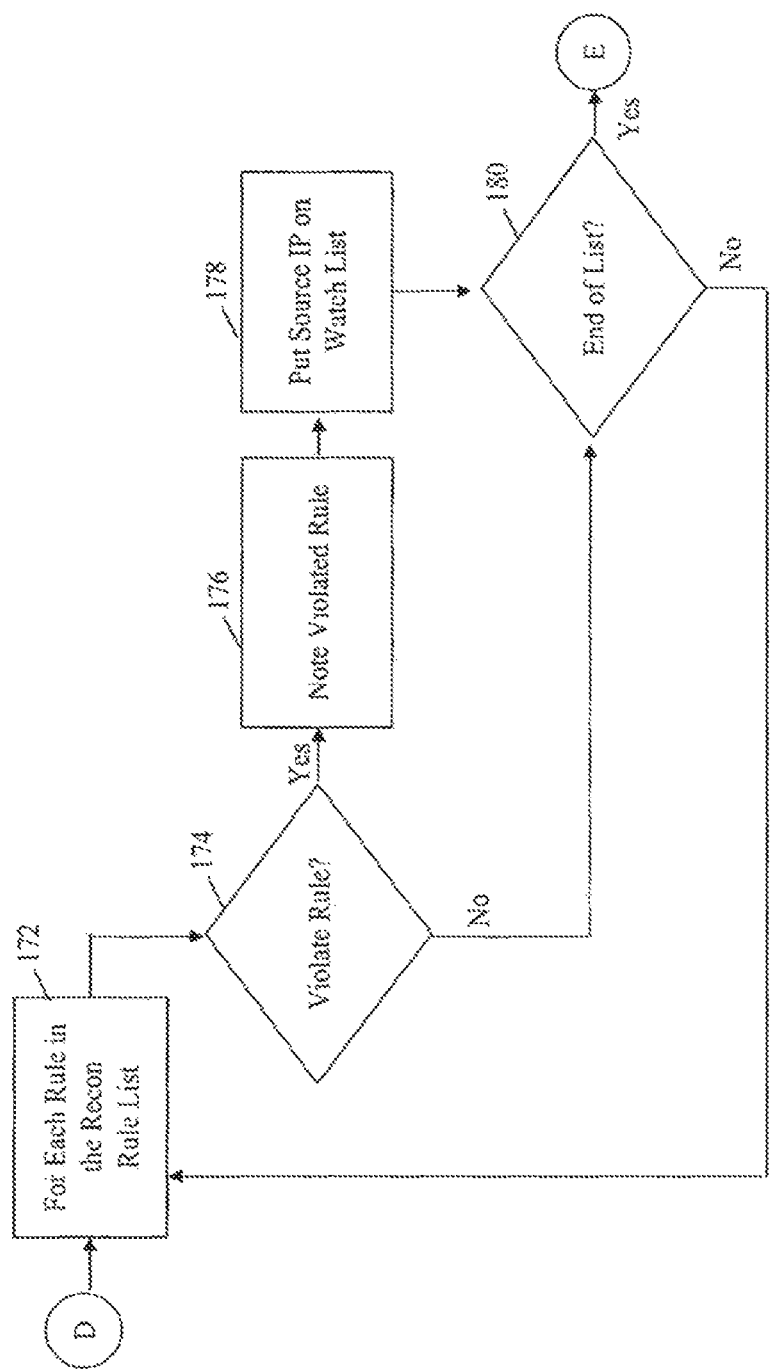
FIG. 8 is a block flow diagram depicting an exemplary method for use by the system as seen in FIG. 1.

FIG. 8 is an exemplary method for determining whether a packet is designed for reconnaissance in a local network segment. For each rule in a reconnaissance rule list, as seen in a block 172, a system may test a packet to determine whether it violates the rule as seen in a block 174. If the packet violates a rule, a system may note the rule and place the IP source on a watch list as seen in a block 178. A system may then continue to test rules as seen in a loop from block 180 to 172. Once all the rules are tested, the system may continue on as seen in block E. Some examples of common reconnaissance rules are: packets with parameters that violate the protocol definition, packets with inappropriate flag configurations, or packets with unusual sequencing or fragmentation.

Figure 9:
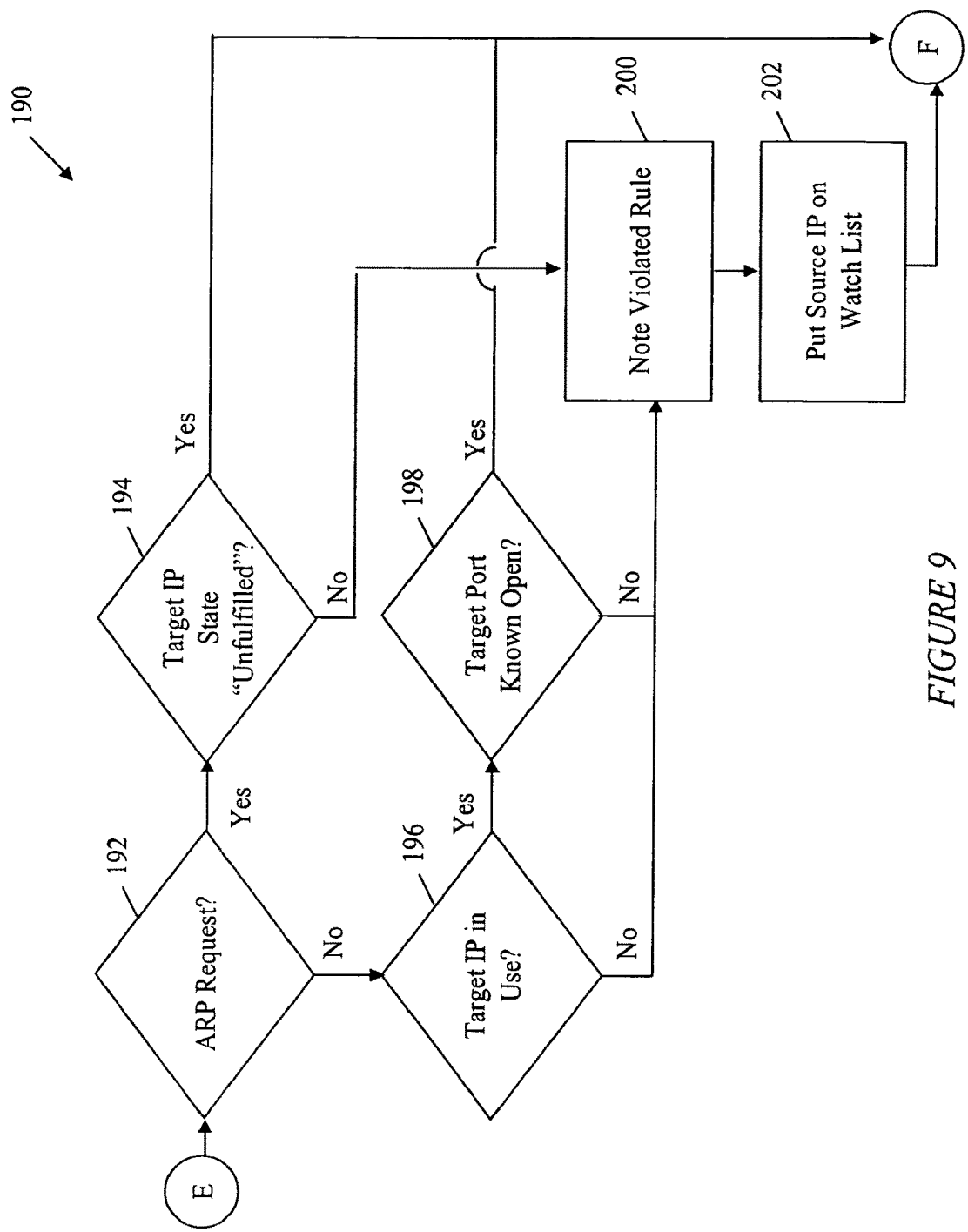
FIG. 9 is a block flow diagram depicting an exemplary method for use by the system as seen in FIG. 1.

FIG. 9 is an exemplary method for testing a target violation. This method tests to determine if a packet has a destination address that is not in use, a port that is known to be closed, or an ARP request with an IP address that does not provide a corresponding reply. The system tests the packet to determine whether it is an ARP request as seen in a block 192. If the packet is an ARP request, a system checks the target IP state to determine whether it is unfulfilled, as seen in a block 194. If it is, the system continues as seen in a block F. However, if the target IP state is not unfulfilled, the system notes a rule violation as denoted by the block 200 and places the source IP address on a watch list as seen in a block 202. If the packet is not an ARP request, the system tests the target IP address of the packet to determine whether it is in use as seen in a block 196. If the target IP address is in use, the system checks to see if the target port on the target device is known to be open as seen in a block 198. If the target IP address is not in use or the target port is not known to be open, the system notes a rule violation-as seen-in a block 200, and places the source IP address of the packet on the watch list. The system then continues as denoted by a block F.

Figure 10:
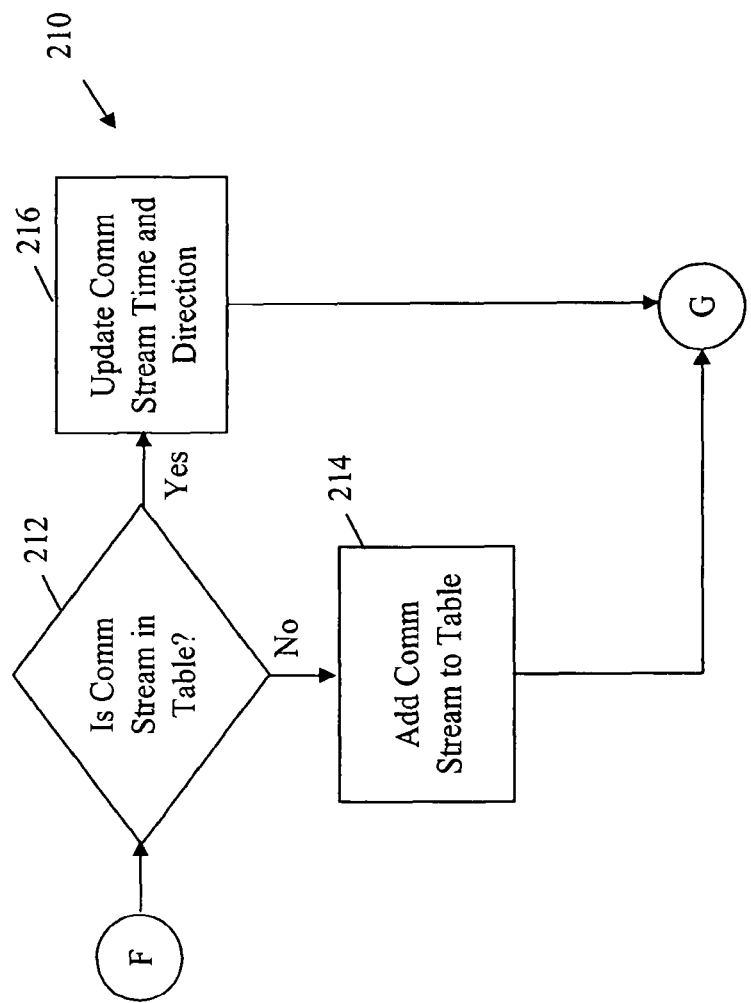
FIG. 10 is a block flow diagram depicting an exemplary method for use by the system as seen in FIG. 1.

FIG. 10 is an exemplary method for updating a communication stream table from block F. The packet is tested to determine whether it is included in the communication stream table as seen in a block 212. If it is not, it is added to the table as seen in a block 214. If it is, the table is updated with the communication stream time and direction, as seen in a block 216. The system then continues as seen in a block G.

Figure 11:
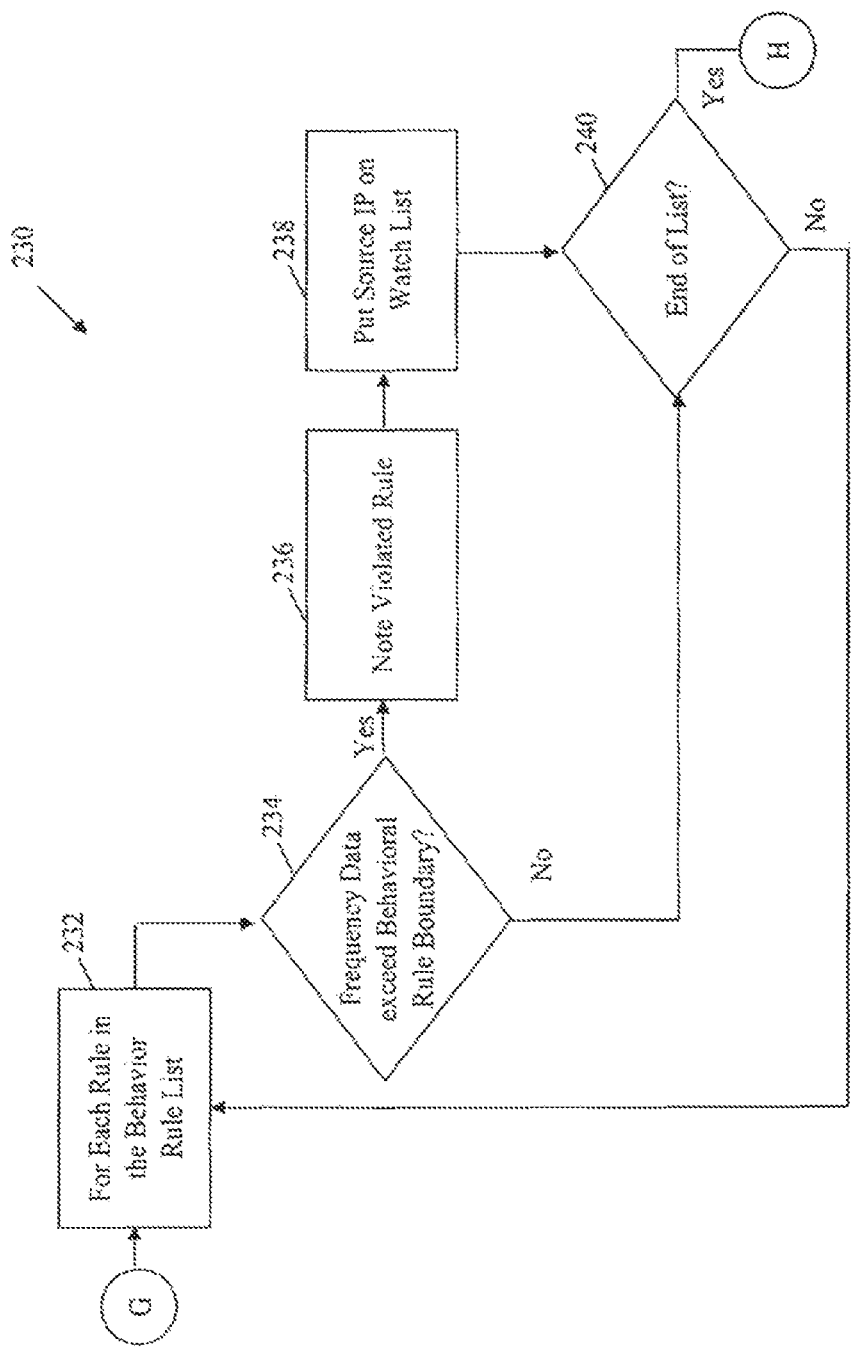
FIG. 11 is a block flow diagram depicting an exemplary method for use by the system as seen in FIG. 1.

Once the communications tables are updated, the system may check for behavioral rule violations. FIG. 11 is an exemplary method for testing whether a behavior rule is violated. For each behavior rule, the system checks the frequency data in the frequency table to determine whether a cell, row, or column in a multi-dimensional array has violated a behavioral rule boundary as seen in a block 234. If the boundary has been violated, the rule is noted as seen in a block 236 and the source IP address is placed in a watch list as seen in a block 238. Once the rules have been tested, the system returns as seen in a block H and continues to collect a subsequent packet, decode it, and process it in the manner seen in FIGS. 5-11.

Figures 12, 13:
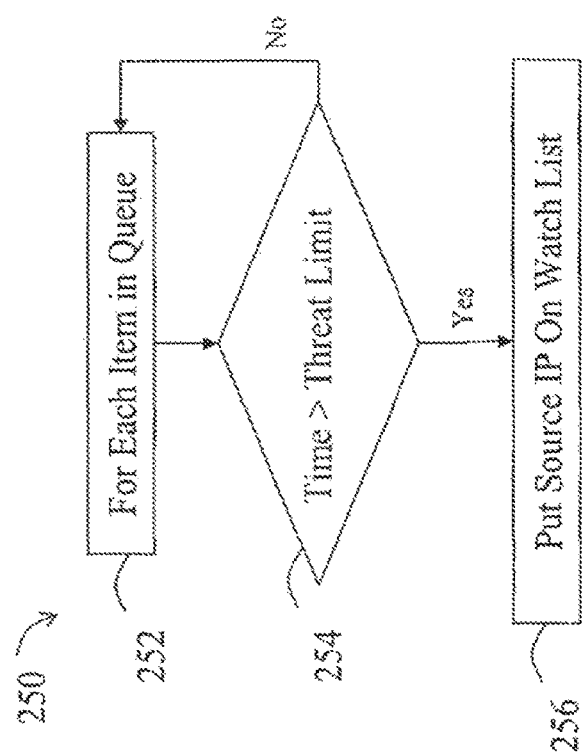
FIG. 12 is a schematic depicting an exemplary embodiment of an ARP queue as used in the method as seen in FIGS. 5-11.
FIG. 13 is a block flow diagram depicting an exemplary method for use in evaluating the ARP queue as seen in FIG. 12.

FIG. 12 is an exemplary embodiment of an ARP request queue. The ARP request queue may include a source IP address, a target IP address, a source MAC address, and the time associated with an ARP request. If a corresponding reply to the request is not received within a specified programmable period of time, the ARP request may have been initiated by a device that represents a threat.

FIG. 13 is an exemplary method in which the time is compared to a set threat limit as seen in a block 254. If the time exceeds the threat limit, the source IP address is placed on a watch list as seen in a block 256. This step may be repeated for each item in the queue as seen in a block 252.

Figures 14, 15:
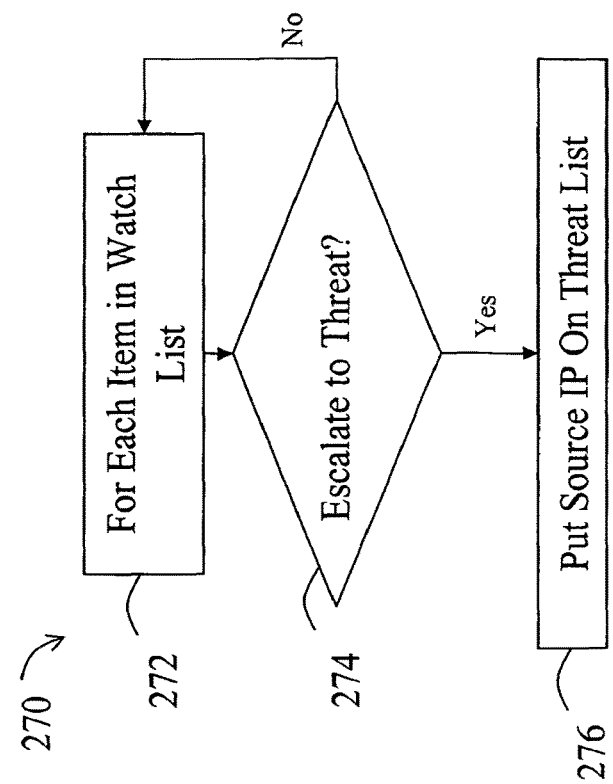
FIG. 14 is an exemplary embodiment of a watch list as used in the methods as seen in FIGS. 5-11.
FIG. 15 is a block flow diagram depicting an exemplary method for use in evaluating the watch list as seen in FIG. 14.

FIG. 14 represents an exemplary embodiment of a watch list. The watch list may include a listing of potentially threatening devices. The watch list, for example, may contain a source IP address, a target IP address, a source physical address, the time the packet was sent; and the denotation of a rule that was violated, among others.

FIG. 15 is an exemplary method for determining whether items in a watch list represent a threat. For each item in the watch list, the system may determine whether it is necessary to elevate or escalate the item to a threat as seen in a block 274. This decision may be based on the type or frequency of rule violations, or various combinations of rule violations and frequency violations. If it is necessary to escalate the watch list to a threat, the system may add the source IP address to a threat list as seen in a block 276. However, various methods may be envisaged.

Conversely, it may become apparent over time that a source IP address does not constitute a threat, in which case it can be de-escalated. For example, a typographical error may have been made in a destination address, without the intent or function of generating a threat. In such an instance, de-escalation would be the appropriate way to return the system to a normal condition.

Figure 16:
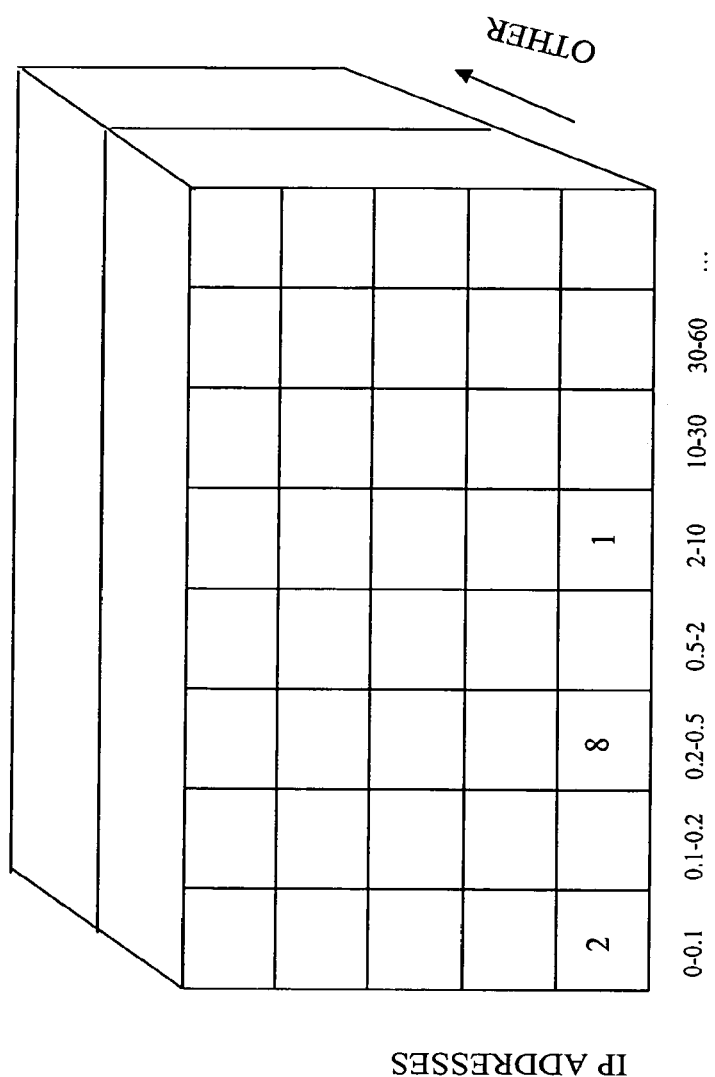
FIG. 16 is a schematic depicting an exemplary embodiment of a multidimensional frequency table for use in the methods of FIGS. 5-11.

FIG. 16 represents an exemplary embodiment of a frequency table. In this exemplary embodiment, a multi-dimensional table is shown with a vertical axis of IP addresses, a horizontal axis of time, and another depth axis. The vertical axis may be a listing of IP addresses. In this exemplary embodiment the listing of IP addresses includes all source addresses of packets.

The time axis may represent bins of varying periods. For example, these periods may represent the time since the last packet associated with the IP address or ongoing time. The number of bins may be set by a user of the system and the size or period represented by the bins may be set and varied along the axis.

Looking at this two-dimensional face, the IP addresses and time, the number of packets sent by the IP address may be tallied over time to produce a frequency table of packets associated with the IP address. Various methods may be used to normalize the frequency table or adjust the values in the various time bins over time or in association with the arrival or transmission of subsequent packets. In one exemplary embodiment, each bin (representing a period less than the period of the most recent packet may be decremented uniformly or with some distribution.

In the multi-dimensional case, other axes may be represented by packet size, destination IP addresses, protocols, message types, and other characteristics. Various behavioral rules may then be established that identify threats by exceeding the boundaries assigned to various cells, columns, or rows. For example, if a single source as represented by its IP address were to frequently send packets into the network to multiple unused IP addresses, that source may be identified as a potential threat seeing the addresses of devices. In other example, if various sources flood a single IP address with messages, it may be determined that a denial of services attack is occurring.

FIG. 17 represents an IP state table. Recall that when an ARP request is identified and added to the ARP request table, the IP state of the target IP address or device is set to "unfulfilled" in an IP state table. Traditionally, an IP address may be in use or not in use. This system, however, tracks various additional states including omitted, automatic, used, unfulfilled, virtual, and unknown. The system uses the IP state table to monitor IP addresses associated with the local network segment and those addresses on the threat list. The IP state table provides the system with a method of monitoring the state of IP addresses on a dynamically changing network segment.

In the case of an ARP request sent to a target IP address, the system sets the state of the target IP address to unfulfilled. If a reply to the ARP request is not received by the source IP address within a given period of time, the target IP address state may be set to virtual. It is possible that the target address is not in use. If a packet is sent from an IP address that is marked as unknown, the system attempts to ascertain the true state of the IP address through various active and passive means. When the true state of the IP address is determined, the state table is updated with the appropriate state value.

Since communication between devices is perceived through packets, the state of the network may be tracked through the IP State table. FIG. 18 depicts a conceptual chart of communications. An IP address may be in use or not in use. A packet may be sent from a source IP address known to be in use to a destination IP address. If the destination IP address is not in use, the sending of the packet to that destination address may be a first clue in perceiving network incursion. Similarly, a sending of a packet from a source known not to be in use may indicate address spoofing by an intruder.

However, a single packet such as an ARP request does not indicate whether the destination IP address is in use. An ARP reply would indicate the use of the destination address. Failure to reply may indicate that the destination address is an unused IP address. However, a device associated with the destination address may have been busy. As such, the devices may be categorized in the state table in categories indicative of knowledge or expectation obtained from observation of other communication with those devices.

Figures 19, 20:
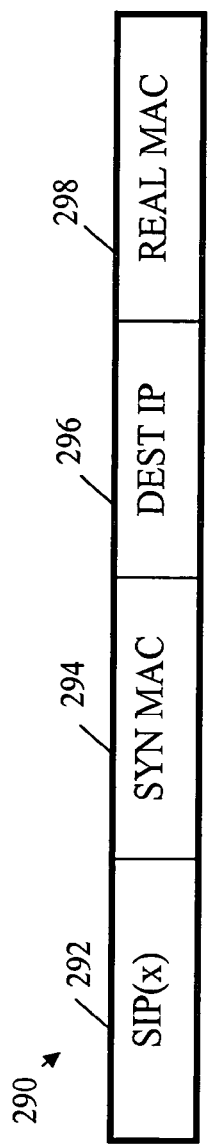
FIG. 19 is a schematic of an exemplary embodiment of a message header for use in the methods as seen in FIGS. 5-11.
FIG. 20 is a schematic of an exemplary embodiment of a communications stream table for use in the methods as seen in FIGS. 5-11.

Turning to FIG. 19, an ARP reply packet 290 is depicted. In this exemplary embodiment, the ARP reply packet 290 is depicted as having .a source IP address 292 with an associated hardware address 294. The associated hardware address is, in this example, a synthetic hardware address. The message 290 also contains a destination IP address 296 and a hardware address 298 associated with the destination IP address 296. If such a message were sent on a local network segment, the ARP table associated with the destination IP address 296 and hardware address 298 would be adjusted. Any subsequent communications sent to the source IP address from the device associated with the destination address would be sent to an incorrect hardware address, preventing communications with the source device, represented in the ARP reply packet 290. The destination device may be a server, gateway, workstation, or other network device. In this manner, communications may be controlled between attacking devices and devices on the local segment of the network.

Turning to the next figure, FIG. 20 depicts an exemplary embodiment of a communications stream table. The communications stream table is one or more tables tracking communications between devices. In one exemplary embodiment, the communications stream tables are tables that each track communications associated with a single protocol. For example, tables may be used to track ICMP, TCP, UDP, and ARP communications. The tables may be associated with the addresses of two devices associated with the number and frequency of data, direction, statistical information, and time of last 'packet. The communication streams tables may be periodically polled to aid in setting the state of IP addresses in the IP state table. For example, if the age of a communications stream exceeds some value, the system may attempt to contact the device associated with the IP address to determine whether it is active or the address is in use. If the device does not respond, the device may be removed from the IP state table. Furthermore, the communications stream tables may be updated if a communications stream becomes stale.

Figure 21:
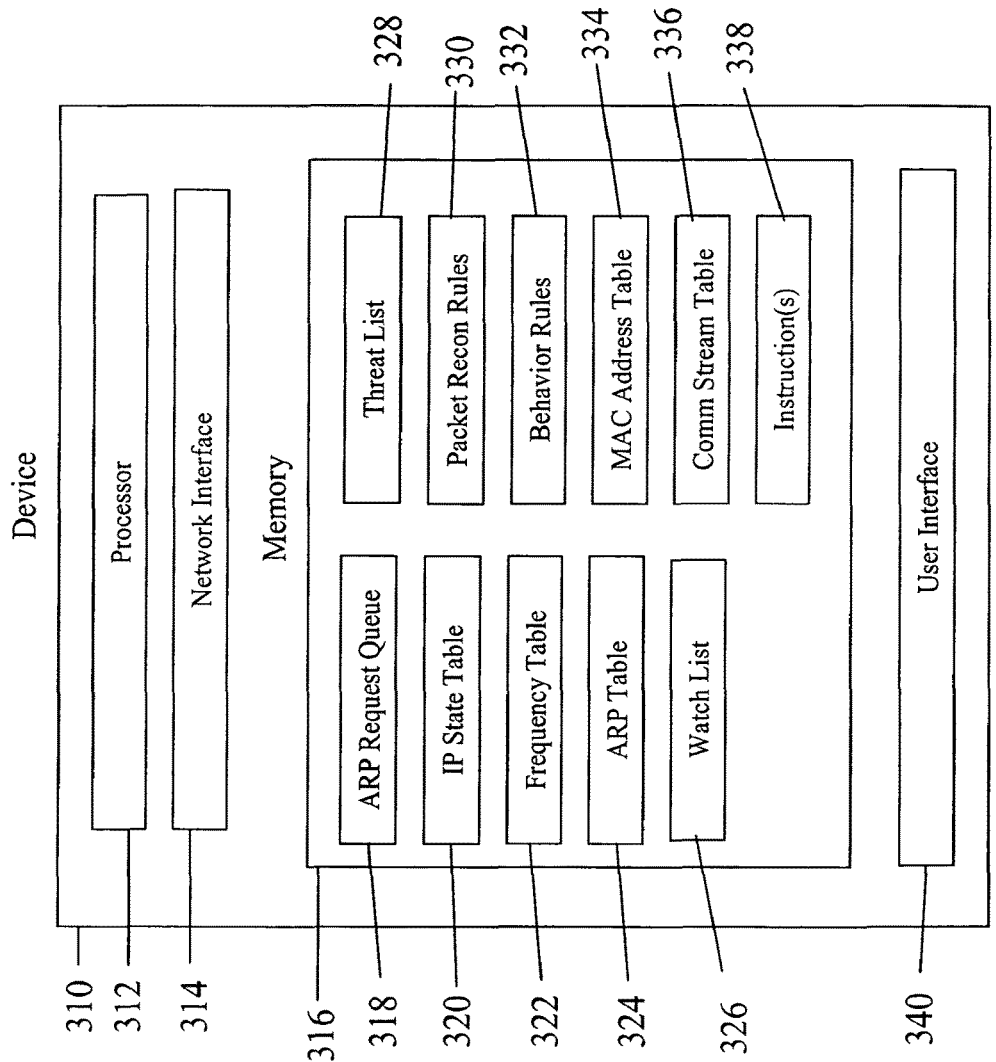
FIG. 21 is a block diagram depicting an exemplary embodiment of a network security device for use in the system as seen in FIG. 1.

FIG. 21 is an exemplary embodiment of a security device for performing the functionality described in the various methods herein. The security device 310 may include a processor 312, a network interface 314, a memory 316, and a user interface 340. The device 310 may also include an ARP request queue 318, an IP state table 320, a frequency table 322; an ARP table 324, a watch list 326, a threat list 328, packet reconnaissance rules 330, behavior rules 332, a MAC address table 334, one or more communications stream tables 336, and various instructions 338, among others. However, each of these elements may or may not be included together, separately, or in various combinations, among others. For example, the data and instructions may reside on a single device or on various devices, among others.

The processor 312 may take various forms including various microprocessors, computational circuitries, and controllers, among others. The processor 312 may interpret various instructions or data and function accordingly.

A network interface 314 may take various forms. These forms may include an Ethernet NIC, a serial cable, a USB port, an AppleTalk connection, and a wireless Ethernet connection, among others. The network interface may function to aid in capturing network packets, sending appropriate messages across the network, and communications with other devices, among others.

The memory 316 may take various forms including ROM, RAM, flash memory, disc drives, floppy drives, CD ~OM's, and DVD ROM's, among others.

The system 310 may or may not include a user interface 340. This user interface may take various forms including a hand-held device, a keyboard, a monitor, a mouse, and remote access interfaces, among others.

The ARP request queue 318 is a listing of ARP requests and the time they were sent. The system attempts to match ARP requests with a corresponding ARP reply. If no match is found over a given period of time, a rule may be violated and the source IP of the ARP request may be placed on a watch list. The table may take various forms including a database file, a tab delimited file, a spreadsheet, a text file, a data file, among others.

The IP state table 320 may include a listing of IP addresses and an associated state. Generally the state is either active or inactive. However, the system applies varying states to the IP address including omitted, automatic, used, unfulfilled, virtual, and unknown, among others. The table may take various forms including a database file, a tab delimited file, a spreadsheet, a text file, or a data file, among others.

The frequency table 322 may take various forms, including that shown in FIG. 16. The frequency table may store data associated with an IP address and the frequency of packet delivery over time. Further, the table may be structured as a multi-dimensional data set with other axes including protocols, packet size, communications type, and' destination address, among others. The frequency table may take various forms including a database file, a tab delimited file, a spreadsheet, a text file, a data file, among others.

The ARP table 324 is typically a listing of IP addresses and an associated physical address on the network. Generally, most devices connected to the network maintain an ARP table. This system may communicate with various devices on a network to adjust values maintained in the various ARP tables.

The watch list 326 may take the form as seen in FIG. 14. The watch list may include a listing of IP addresses that have violated various rules. IP addresses listed in the watch list may be elevated and identified as potential threats, and placed in a threat list 328. The threat list may be a listing of IP addresses associated with devices that are known to be threats to the system. This list may be used to determine which packets entering the local network segment represent a threat and to prevent those packets from accessing devices on the local segments.

A device 310 may include packet reconnaissance rules 330. These rules may be used to determine from the packet information whether the packet is designed to reconnoiter on the local segment. If the packet violates these rules, the source IP address for the packet may be placed on the watch list.

The behavioral rules 332 may be rules, boundaries, or thresholds that are compared to frequency table 322. If cells, columns, or rows violate these boundaries or thresholds, the IP address associated with the violation may be marked as a potential threat and placed on a watch list or the threat list 328.

The system may also include a table of synthetic MAC addresses. Alternately, the system may include a version of an ARP table associating IP address with real physical addresses, or a combination of both synthetic MAC addresses and real physical addresses. It should be understood through this description of an illustrative embodiment, that although the use of tables is mentioned here, the present invention may use other types of persistent, logically addressable storage mechanisms for the different types of addresses. In either case, the table may be used to determine whether an address is a synthetic address and be used in re-creating or re-structuring the packets for delivery to the appropriate physical device.

The Communications stream table or tables 336 may take various forms including a database file, a tab delimited file, a spreadsheet, a text file, a data file, among others. The communications stream tables 336 may track communications between devices as discussed in relationship to FIG. 20.

The instructions 338 may include various operating instructions and computer-implemented instructions for implementing the methods herein, among others. These instructions may take the form of interpretive instructions, programs, and additional data, among others.

However, these elements may or may not be included together, separately, or in various combinations, among others. For example, various devices may be combined to function and store the data and instructions described above.

Figure 22:
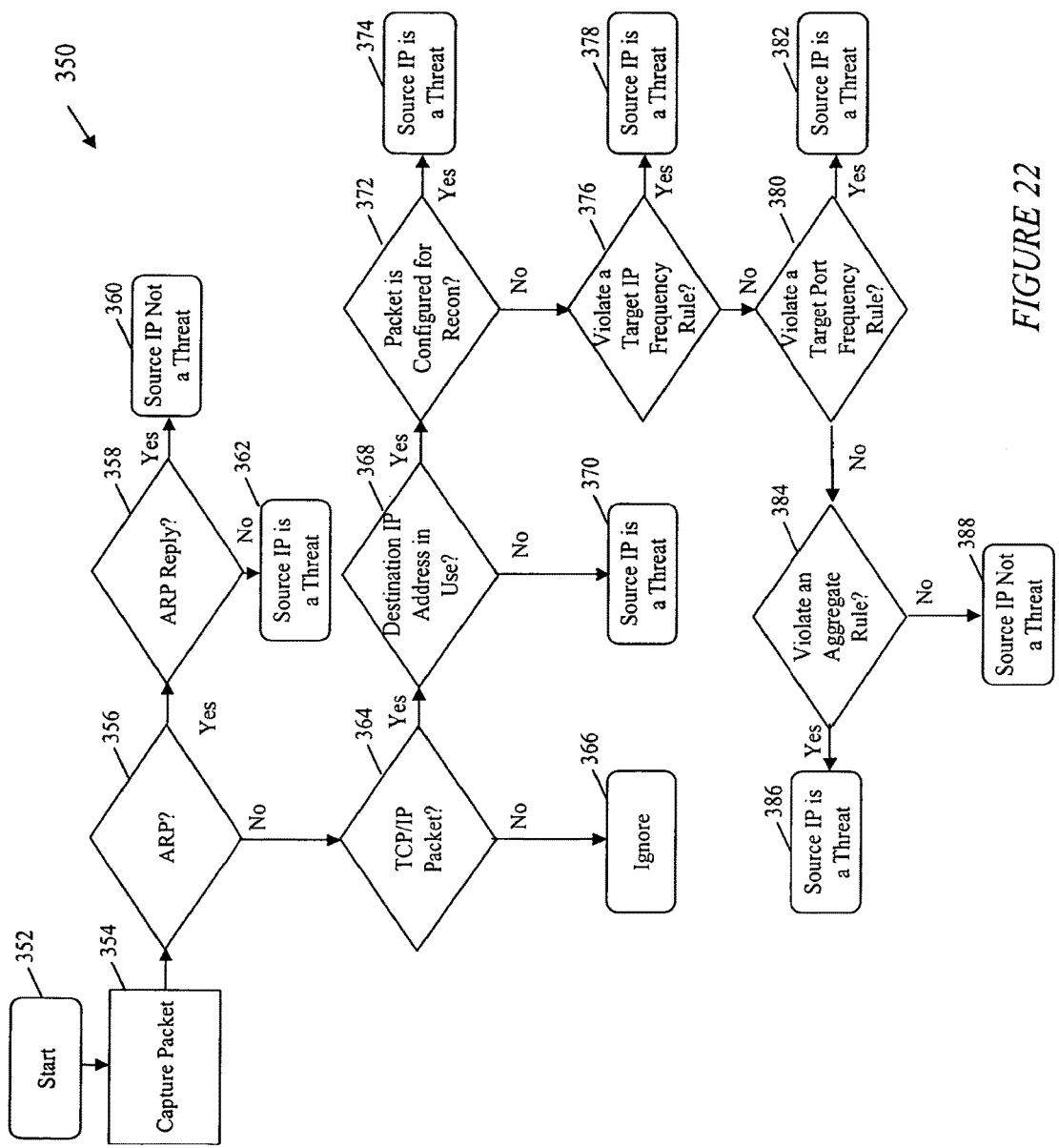
FIG. 22 is a block flow diagram depicting an exemplary method for use by the system as seen in FIG. 1.

FIG. 22 is another exemplary method for perceiving threats to the system. Hereto the system captures the packet as seen in a block 354. The system determines whether the packet is an ARP packet as seen in a block 356. The packet may be an ARP request or an ARP reply as seen in a block 358. From this it may be determined whether the source IP address is a threat as seen in a block 362, or not a threat as seen in a block 360.

Further, the packet may be tested to determine whether it is a TCP/IP packet as seen in a block 364. If it is not a TCP/IP packet, it may be ignored as seen in a block 366 or forwarded for processing in accordance with other packet protocols. If the packet is a TCP/IP packet, a destination IP address may be tested as seen in a block 368. If the destination IP address is not in use, the source IP address may represent a threat as seen in a block 370. If the destination IP address is in use, the packet may be subjected to further tests. For example, the packet may be tested to determine whether it represents a reconnaissance packet as seen in a block 372. If it is a reconnaissance packet, the source IP address may be a threat as seen in a block 374.

Further, the packet may be tested to determine whether it violates a frequency rule as seen in a block 376 or a target port frequency rule as seen in a block 380. In either case, a violation of a rule may indicate that the source IP address is a threat as seen in blocks 378 and 382, respectively. Further, the packet may be tested to determine whether it violates the aggregate rules as seen in a block 384. If it does violate these rules, it may represent a threat as seen in a block 386. However, if the packet does not violate the rules, it may not represent a threat as seen in a block 388.

Figure 23:
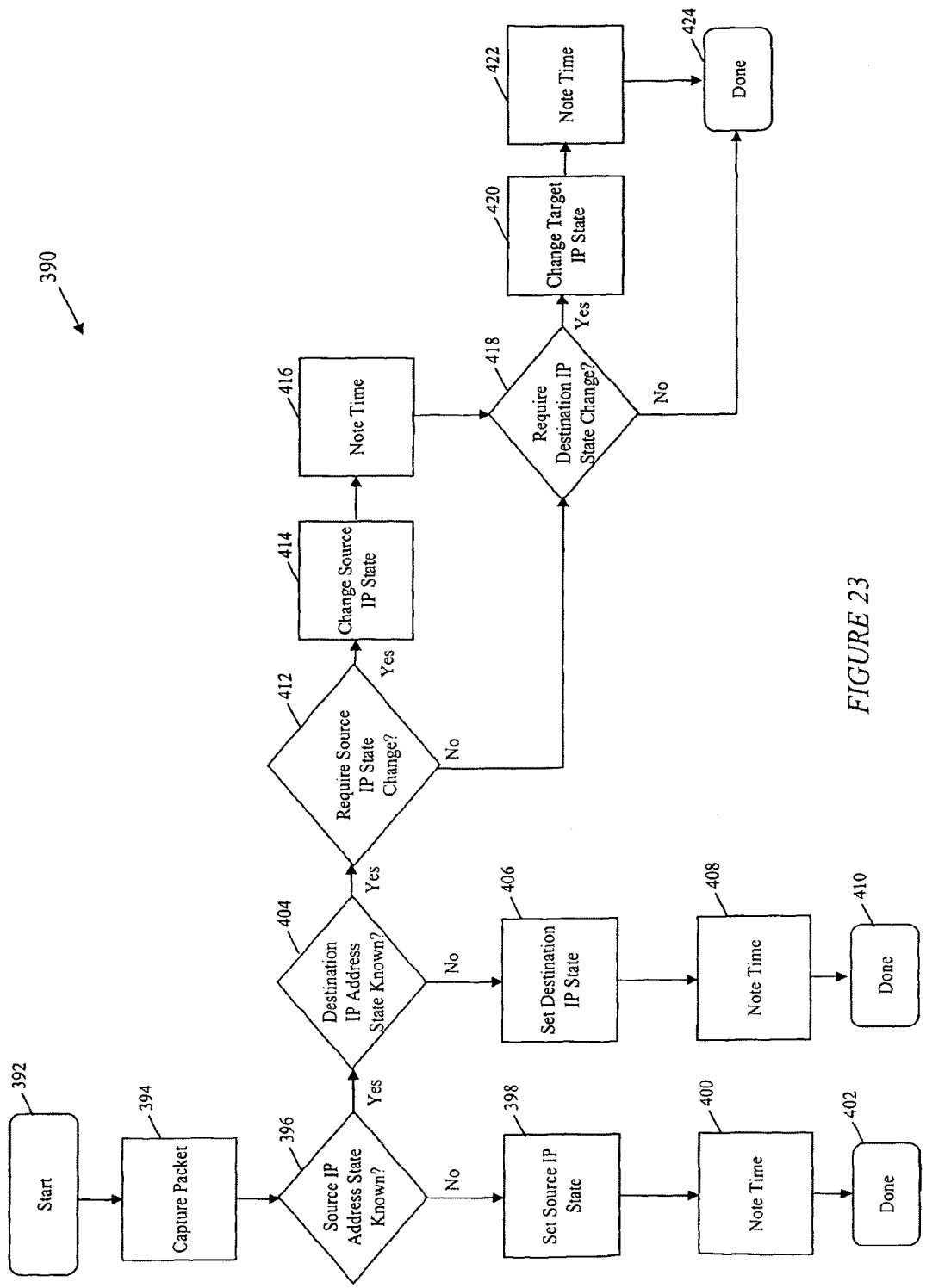
FIG. 23 is a block flow diagram depicting an exemplary method for use by the system as seen in FIG. 1.

FIG. 23 is an exemplary method for creating and maintaining an IP address state table. Hereto the system may capture a packet as seen in a block 394. The system may test to determine whether the source IP state is known. If it is not known, the system may set the source IP state as seen in a block 398 and note the time as seen in a block 400. If it is known, the system may test to determine whether the destination IP address state is known. If that state is not known, the destination IP address state may be set as seen in a block 406, and the time noted, as seen in a block 408. Further, the system may test the packet configuration to determine whether the source IP state requires change as seen in a block 412. If the source IP state is to be changed, the system may change these source IP states as seen in a block 414 and note the time as seen in a block 416. In either case, the system may further test to determine whether the destination IP state requires change as seen in a block 418. If change is required, the system may change the state of the target IP address as seen in a block 420 and note the time as seen in a block 422.

Figure 24:
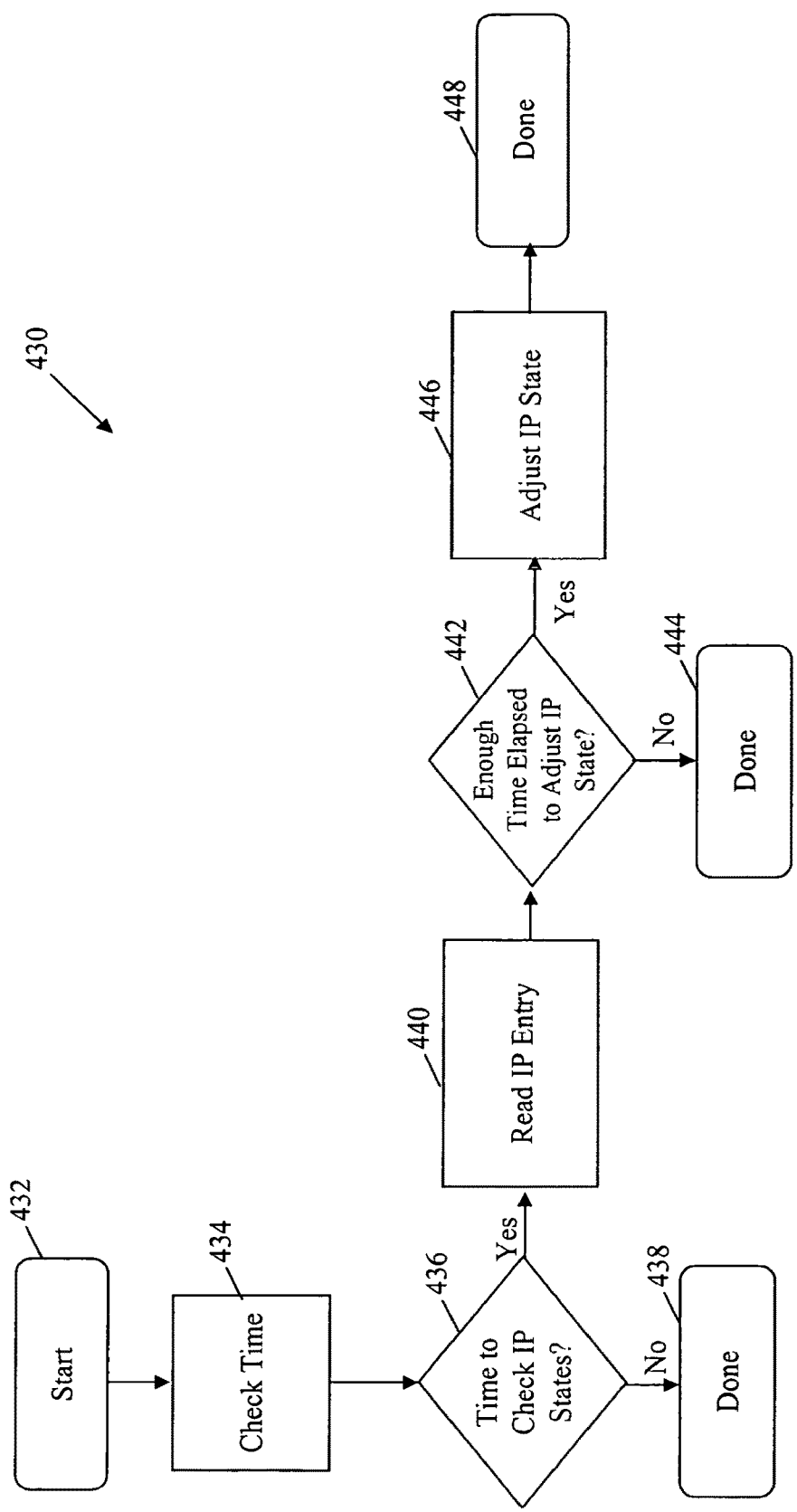
FIG. 24 is a block flow diagram depicting an exemplary method for use by the system as seen in FIG. 1.

FIG. 24 represents adjustment of an IP address state. In this case, the system checks the time as seen in a block 434. The system determines whether there is an appropriate time to check the IP state as seen in a block 436. If it is not, the system does nothing as seen in a block 438. If it is time to check the states, the system checks each entry on an IP state table as seen in a block 440. If enough time has elapsed, as seen in a block 442, the system adjusts the IP state as seen in a block 446.

Figure 25:
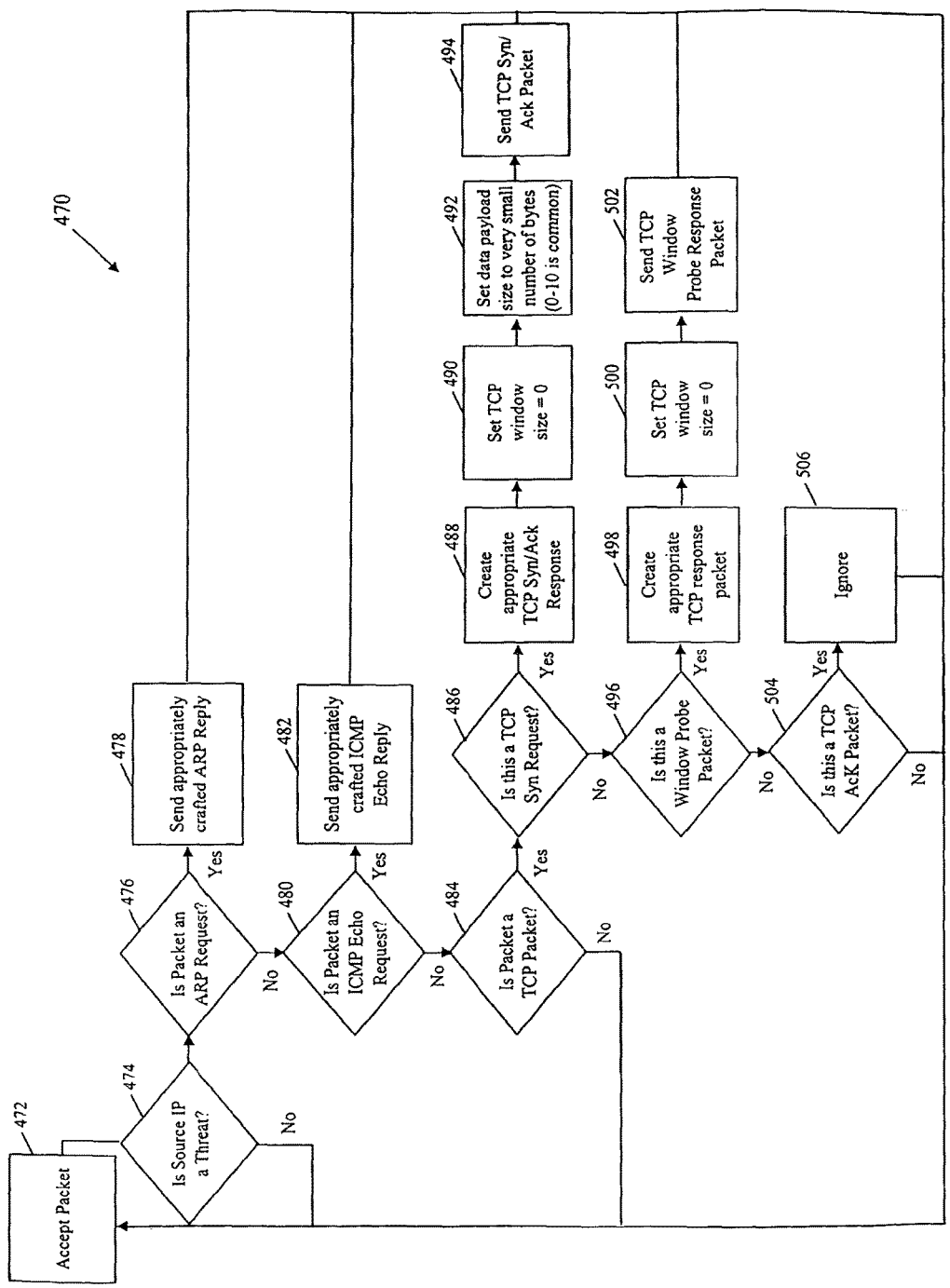
FIG. 25 is a block flow diagram depicting an exemplary method for use in the system as seen in FIG. 1.

FIG. 25 is an exemplary embodiment of a defense method as described in relation to FIG. 5. The system may accept a packet as seen in a block 472. The system may test the source IP address of the packet to determine whether it represents a threat. If the source IP address does not represent a threat, the system may accept a subsequent packet. If the source IP address does represent a threat, the system may test the packet for various protocols and packet types as seen in blocks 476, 480 and 484. For example, if the packet is an ARP request from a known threat, the system may send an appropriately crafted ARP reply. The reply fools an attacking computer into believing that a computer exists at the target IP address and sets the stage to allow for future connections.

If the packet is an ICMP echo request as seen in a block 480, the system may send an appropriately crafted ICMP echo reply as seen in a block 482. In this case, an attacker may be performing reconnaissance. An appropriate response makes the attacking computer believe a real computer exists at the target IP address.

If the packet is a TCP packet as seen in a block 184, the system may test for various types of TCP packets. For example, the system may test to determine whether the TCP packet is a SYN request as seen in a block 486. If it is, the system may create an appropriate acknowledgement response as seen in a block 488. This acknowledgement response may include the TCP window size set to zero and the data of payload size set to a very small number as seen in blocks 490 and 492. The TCP SYN request indicates that an attacker may be trying to connect the first time. By sending the suggested response, the attacker's computer is provided with parameters requiring it to do extra work sending small packets and effectively occupying computational cycles. If enough threads of such TCP packets are sent out, communications to the attacker's computer may effectively be slowed.

If the TCP packet is a window probe packet as seen in 496, the attacker may be trying to increase the speed of their attack by requesting a verification of a maximum window size. Here, to, an appropriate TCP response packet may be crafted as seen in a block 498. Again, the TCP window size may be set to zero and the window probe response packet be sent as seen in blocks 500 and 502, respectively. If the TCP packet is an ACK packet, the attacker may be sending the attacking packets. Typically, the attacker's computer will wait about four minutes before being allowed to try and send another packet. In this case, if the packet is ignored as seen in a block 506, the attacker's efforts are effectively slowed while his computer waits over the appropriate response period.

Figure 26A:
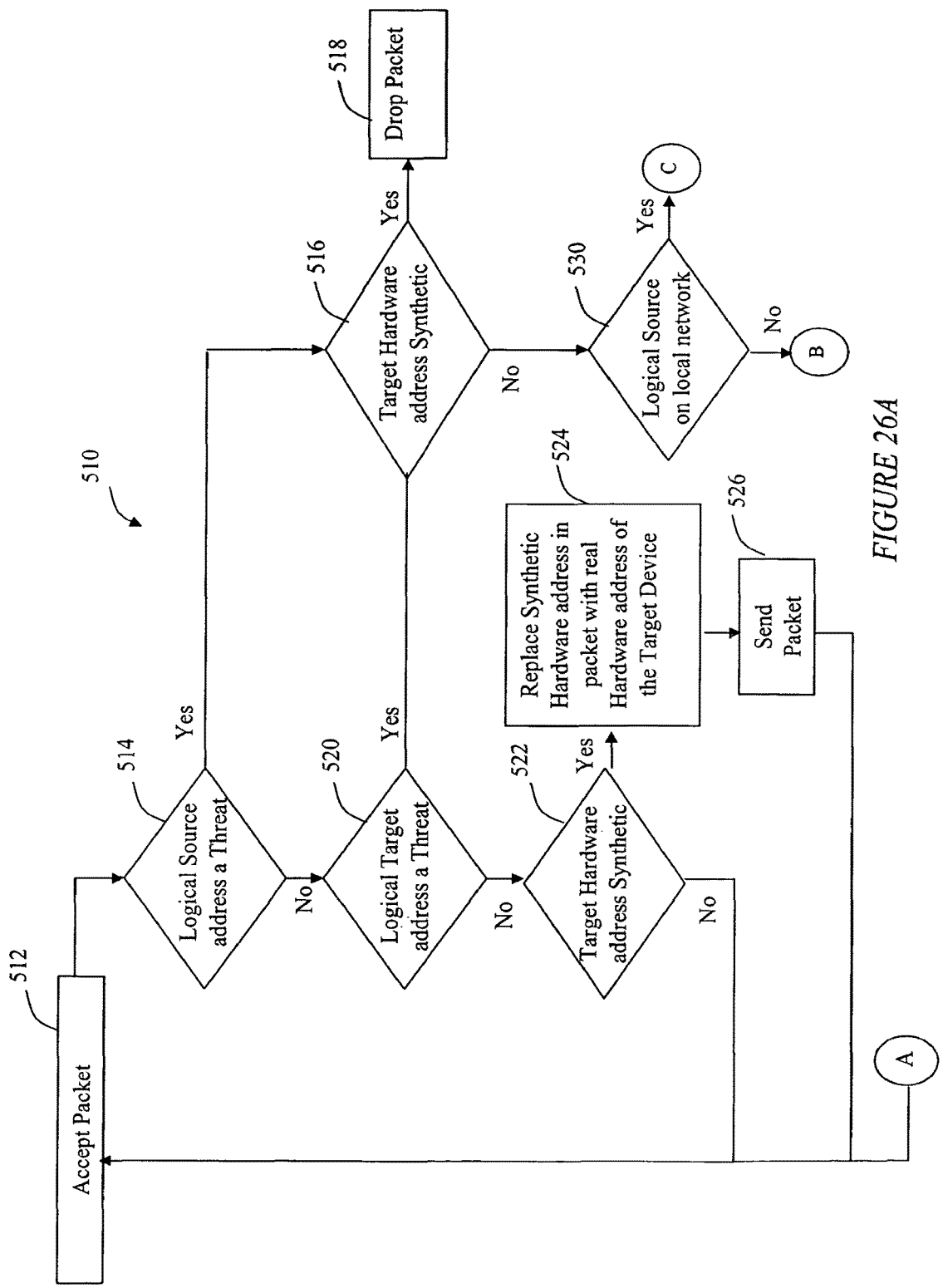
FIGS. 26A and 26B are block flow diagram depicting exemplary methods for use in the system as seen in FIG. 1.
Figure 26B:
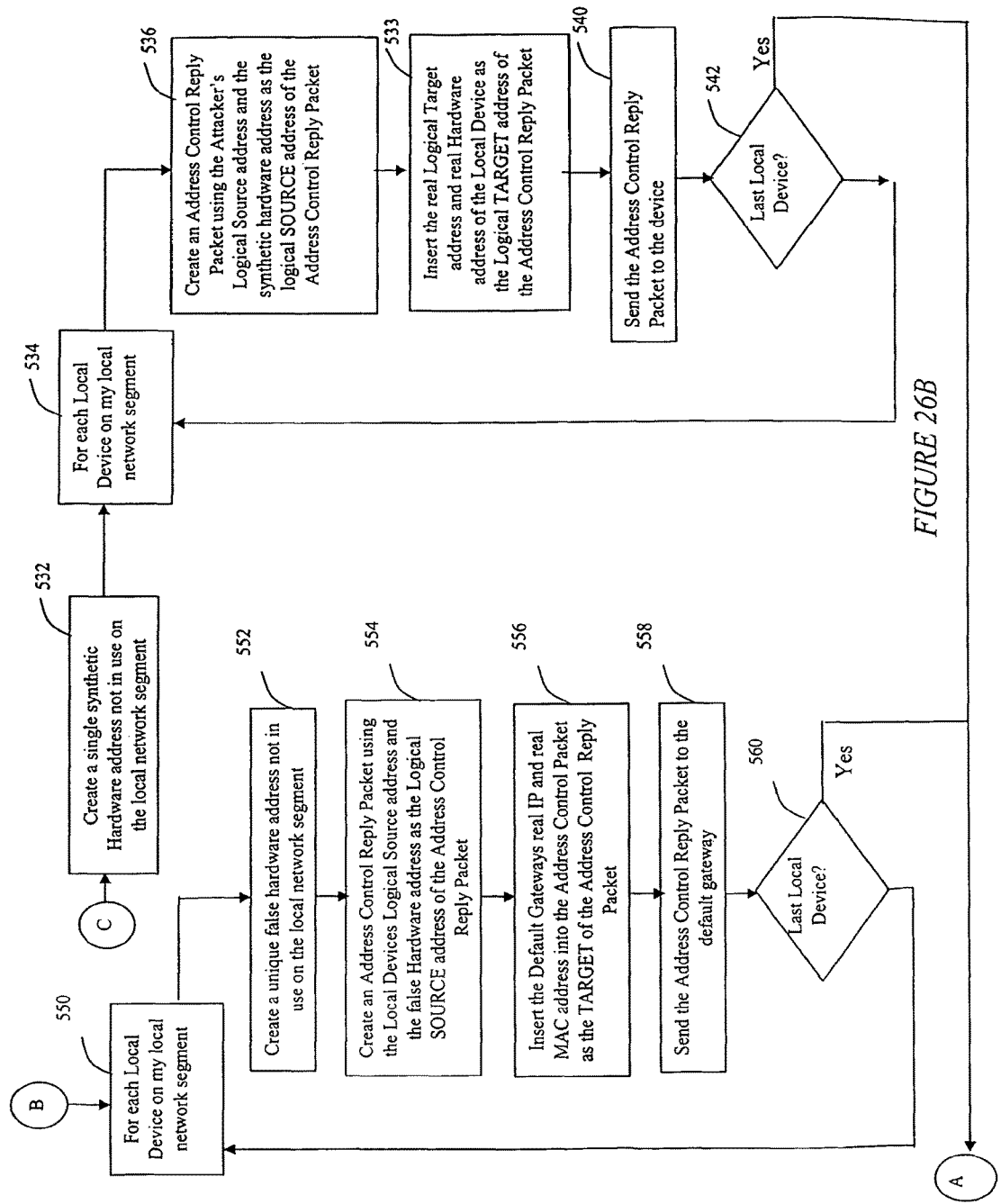

FIGS. 26A and 26B represent a potential defense against an attack. In this method 510, the communications between an attacking computer and other devices on the local network is controlled. The system may accept a packet as seen in a block 512. The source IP address and the target IP address may be tested to determine whether they represent a threat as seen in blocks 514 and 520, respectively. If they do represent a threat, the target physical address may be tested to determine whether it is a synthetic address as seen in a block 516. If the target physical address is synthetic, the packet may be dropped as seen in a block 518 or forwarded to an alternate device or appropriate network security device such as a sacrificial computer or other defense device. The target physical address or synthetic address may be hardware addresses such as MAC addresses.

If the target physical address is not synthetic, then the system may be under attack from a new source and an appropriate control must be implemented. In this case, the IP address is tested to determine whether the source is on the local network as seen in a block 530. If the source is on the local network, then a single synthetic physical address is created. The synthetic physical address may, for example, be an address not in use on the local segment. Then, for each local device on the local segment, the system may create an ARP packet using the attacker's source IP address and the synthetic physical address as the source of the ARP packet as seen in a block 536. An example of the ARP packet is described in relation to FIG. 19. The destination of the ARP packet may be the IP address and physical address of the local device as seen in a block 538. The packet may then be sent as seen in a block 540. This process is repeated for all devices on the local network. This method effectively adjusts the ARP tables on local devices, providing a false address for the attacker's computer.

Subsequently, for each device on a local network segment, a unique synthetic physical address may be created in a process similar to that seen in a block 552. An ARP packet may then be created using the local device source IP address and the synthetic MAC address as the source of the ARP packet. The physical address of the threat may be set as the destination of the ARP packet similar to that seen in a block 556. Then, the ARP packet may be sent to the threat similar to that seen in a block 558. Again, this process is repeated for all devices on the local network. In effect, communications emanating from the threat entering are sent to addresses other than those of the devices on the local network, masking those devices.

If the source is not on the local network, then for each device on a local network segment, a unique synthetic physical address may be created as seen in a block 552. An ARP packet may then be created using the local device source IP address and the synthetic MAC address as the source of the ARP packet. The physical address of the default gateways may be set as the destination of the ARP packet as seen in a block 556. Then, the ARP packet may be sent to the default gateway as seen in a block 558. Again, this process is repeated for all devices on the local network. In effect, communications entering the local network are sent to addresses other than those of the devices on the local network, masking those devices from devices external to the network.

If however, the source IP address and the target IP address are not of interest or do not represent threats, the packet may be tested to determine whether the target physical address is synthetic as seen in a block 552. If the target address is synthetic, the system may replace the synthetic address with an appropriate real address of the target device as seen in a block 524. Subsequently, the system may send the reformulated packet as seen in a block 526.

In performing this method, the system may maintain a listing of synthetic hardware or physical addresses and the real hardware or physical address on the network. When checking for a synthetic address, the system may compare the hardware address to the list. When seeking to reform the packet, the system may substitute the real hardware or physical address for the synthetic address.

Figure 27:
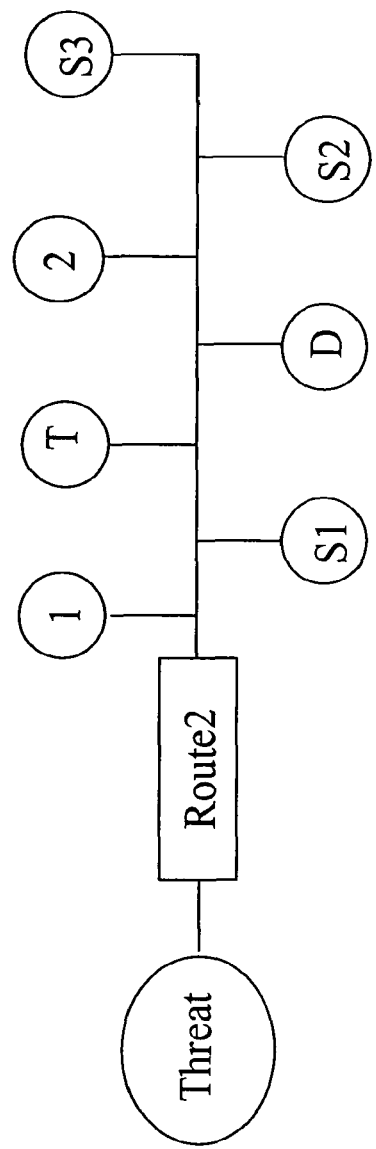
FIG. 27 is a schematic diagram depicting an exemplary embodiment of a network as seen in FIG. 1.

FIG. 27 is a schematic block diagram depicting an exemplary embodiment of a system. In this case, a local network segment is depicted to the right side of a router. Along the segment may be physical devices 1 and 2, and a security device D. There may also be various physical addresses, S1, S2 and S3 that are not in use on the local network segment. If a threat penetrates the local network segment as denoted by the "T" block to the right of the router, then any communications with the threat outside the local network segment may be effectively controlled by preventing devices 1 and 2 from communicating with the threat. In this case, the ARP tables of these devices 1 and 2 may be adjusted such that they send their responses to a synthetic address on the network. In this manner, the threat inside the local network segment will never receive a reply to any messages sent to devices 1 and 2 on the local network segment. This disruption may be accomplished by a security device D sending an ARP packet to devices 1 and 2 providing them with a false physical address associated with the threat's IP address.

In another exemplary embodiment, the threat may exist outside the local network segment as denoted by the threat block. In this case, the threat may-be mitigated by providing a false physical address for each device on the local network. In this case, any communications designed to go to device 1 or 2 may be instead be directed to a synthetic address such as S 1 or S2 the security device D may send synthetic addresses for each device 1 and 2 on the network to a gateway device. In this manner, when the gateway device seeks to route communications from the threat outside the local network segment to devices on the network, it instead sends these packets to the synthetic address S 1 and S2, respectively.

Aspects of the invention may be found in a system, method and computer readable medium for managing logical and physical address state lifecycles. Aspects of the invention may be found in a system, method, and computer-readable medium for managing logical and physical address state lifecycles. The method can include assigning a respective state of unknown to a first address of multiple addresses when the respective state of the first address has not been assigned. The method further includes changing the respective state of the first address when a communication is targeted to the first address. The addresses can include all valid logical addresses for a corresponding set of devices on a segment of a network, or all valid physical addresses for a corresponding set of devices on a segment of a network.

The respective state of the first address can be changed to used when the communication indicates that the first address corresponds to a device in use. The respective state of the first address can be changed to unfulfilled when the communication includes an address resolution protocol request sent to a device having the first address when a time limit .for a response to the address resolution protocol request has not expired. The respective state of the first address can be changed to omitted when the first address corresponds to a device, and communication with the device is omitted from being observed. In addition, the respective state of the first address can be changed to omitted when the respective state of the first address is programmed to be omitted from the changing.

The respective state of the first address can be changed to virtual when the communication is received at the first address when the respective state of the first address is unfulfilled, and a time limit for responding to the communication expires before a response is sent by the first address. The respective state of the first address can be changed to unknown when the respective state of the first address is not unknown, and the first address does not participate in the communication within a time limit. The respective state of the first address can be changed to automatic when an automatic reply is programmed to be sent to a second address when the first address receives a packet from the second address.

Additional aspects of the invention may be found in a system for managing logical and physical address state lifecycles. The system may be a computational device including a processor or network interface and memory or computer-readable medium, among others. The device may or may not include a user interface. Further, the device may have various data and instructions associated with various methods for managing logical and physical address state lifecycles. These data may include an ARP request queue, an IP state table, a frequency table, an ARP table, a watch list, a threat list, a synthetic physical address table, and a communications stream table, among others. The device may also include packet instructions for evaluating reconnaissance rules, behavioral rules and other rules, among others. Further, the system may include software or computer interpretable instructions for performing various methods associated with maintaining the data in the tables and collecting the data for the tables.

As such, a system, method and computer-readable medium for managing logical and physical address state lifecycles are described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

What is claimed is:

1. A method comprising:
capturing, by executing an instruction with a processor, a data packet from a network;
determining, by executing an instruction with the processor, whether the data packet is associated with a known threat based on whether an address in the data packet is in a table of addresses associated with known threats;
when the data packet is not associated with the known threat:
  processing, by executing an instruction with the processor, the data packet to generate processed information, the data packet including a source address, a target address, and a target hardware address, the source address including an Internet Protocol (IP) address and a port;
  updating, by executing an instruction with the processor, at least one record in a frequency table based on at least the processed information, the at least one record indicating a number of packets sent by the source address;
  comparing, by executing an instruction with the processor, the processed information to at least one of a behavioral rule and a reconnaissance rule, at least one of the behavioral rule and the reconnaissance rule generated or modified based on an update of the frequency table;
  determining, by executing an instruction with the processor, that the data packet is associated with a new threat if the processed information violates at least one of the behavioral rule and the reconnaissance rule;
  in response to determining that the data packet is associated with the new threat, generating, by executing an instruction with the processor, an address resolution protocol (ARP) packet using a false hardware address;
  transmitting, by executing an instruction with the processor, the ARP packet to a gateway to invoke a defense mechanism; and
  in response to receiving an additional data packet from the source address and addressed to the false physical address, dropping, by executing an instruction with the processor, the additional packet.

2. A method per claim 1, further including updating the table of addresses to indicate that the address is associated with the new threat when the processed information violates at least one of the behavioral rule and the reconnaissance rule.

3. A method per claim 1, wherein invoking the defense mechanism includes sending a reply to the source address to represent that a computer is accessible via the target address, the reply to entice an attacking computer to continue communication with the target address without spreading the new threat to the network.

4. A method per claim 1, further including, when at least one of the source address or the target address is determined to be associated with the new threat, and when the target physical address is not associated with a physical device, dropping the data packet.

5. A method per claim 4, further including:
in response to determining that the target physical address is not associated with a physical device, replacing the target physical address in the data packet with a real address of a target device; and
sending the data packet with the real address of the target device.

6. A method per claim 1, wherein invoking the defense mechanism includes:
when the source address is determined to be associated with the new threat, determining whether the source address is located within the network;
generating an address control reply packet using a false physical address;
sending the address control reply packet to a default gateway when the source address is not located within the network; and
sending the address control reply packet to the source address when the source address is located within the network.

7. A method per claim 1, wherein updating the record in the frequency table includes:
in response to detecting that the protocol is an address resolution protocol and the data packet is a first request that is not within a queue:
adding the first request to the queue;
recording the target address of the data packet to an unfulfilled state in an IP state table;
adding the source address to a frequency table;
adding the target address to the frequency table;
updating data packet frequency values based on the frequency table; and
identifying a threat based on the source address, the target address, and the data packet frequency values.

8. A method per claim 1, wherein updating the record in the frequency table includes:
in response to detecting the protocol is an address resolution protocol and the data packet is a reply:
determining that a second request corresponding to the reply exists within a queue; and
removing the second request from the queue;
adding the source address to a frequency table;
adding the target address to the frequency table;
updating data packet frequency values based on the frequency table; and
identifying a threat based on the source address, the target address, and the data packet frequency values.

9. An apparatus comprising:
one or more processors; one or more memory that stores instructions that, when executed by the one or more processors cause:
a data analyzer to capture a data packet from a network, determine whether the data packet is associated with a known threat based on whether an address in the data packet is in a table of addresses associated with known threats;
a data processor to, in response to the data analyzer determining that the data packet is not associated with the known threat:
process the data packet to generate processed information, the data packet including a source address, a target address, and a target physical address, the source address including an Internet Protocol (IP) address and a port;
update at least one record in a frequency table based on at least the processed information, the at least one record indicating a number of packets sent by the source address;
a rules analyzer to, in response to the data analyzer determining that the data packet is not associated with the known threat:
compare the processed information to at least one of a behavioral rule and a reconnaissance rule, including at least one of the behavioral rule and the reconnaissance rule generated or modified based on an update of the frequency table; and
determine that the data packet is associated with a new threat if the processed information violates at least one of the behavioral rule and the reconnaissance rule;
a packet generator to, in response to determining that the data packet is associated with the new threat:
generate an address resolution protocol (ARP) packet using a false physical address;
transmit the ARP packet to a gateway to invoke a defense mechanism; and
a defender to invoke the defense mechanism, the defense mechanism to include dropping an additional packet when receiving the additional packet from the source address addressed to the false physical address.

10. An apparatus per claim 9, further including a table updater to update the table of addresses to indicate that the address is associated with the new threat when the processed information violates at least one of the behavioral rule and the reconnaissance rule.

11. An apparatus per claim 9, wherein the defender invokes the defense mechanism by sending a reply to the source address to represent that a computer is accessible via the target address, the reply to entice an attacking computer to continue communication with the target address without spreading the new threat to the network.

12. An apparatus per claim 9, wherein, when at least one of the source address or target address is determined to be associated with a threat and when the target physical address is not associated with a physical device, the defender is to drop the data packet.

13. An apparatus per claim 12, wherein the defender, in response to determining that the target physical address is not associated with a physical device, is to replace the target physical address in the data packet with a real physical address of the target, and is to send the data packet with the real physical address of the target.

14. An apparatus according to claim 9, wherein the defender, in response to determining the source address is associated with the new threat, is further to determine whether the source address is located within the network, generate an address control reply packet using a false physical address, send the address control reply packet to a default gateway when the source address is not located within the network, and send the address control reply packet to the source address when the source address is located within the network.

15. A storage device comprising:
one or more processors; one or more memory that stores instructions that, when executed by the one or more processors, cause the storage device to at least:
capture a data packet from a network;
determine whether the data packet is associated with a known threat based on whether an address in the data packet is in a table of addresses associated with known threats;
when the data packet is not associated with the known threat:
  process the data packet to generate processed information, the data packet including a source address, a target address, and a target physical address, the source address including an Internet Protocol (IP) address and a port;
  update at least one record in a frequency table based on at least the processed information, the at least one record indicating a number of packets sent by the source address;
  compare the processed information to at least one of a behavioral rule and a reconnaissance rule, at least one of the behavioral rule and the reconnaissance rule generated or modified based on an update of the frequency table;
  determine that the data packet is associated with a new threat if the processed information violates at least one of the behavioral rule and the reconnaissance rule;
  in response to determining that the data packet is associated with the new threat, generate an address resolution protocol (ARP) packet using a false physical address
  transmit the ARP packet to a gateway to invoke a defense mechanism; and
  drop an additional packet when receiving the additional packet from the source address addressed to the false physical address.

16. A storage device per claim 15, wherein the instructions, when executed, further cause the storage device to:
update the table of addresses to indicate that the address is associated with the new threat when the processed information violates at least one of the behavioral rule and the reconnaissance rule.

17. A storage device per claim 15, wherein the instructions, when executed, further cause the storage device to:
invoke the defense mechanism by sending a reply to the source address to represent that a computer is accessible via the target address, the reply to entice an attacking computer to continue communication with the target address without spreading the threat to the network.

18. A storage device per claim 15, wherein the instructions, when executed, further cause the storage device to:
in response to determining that the target physical address is not associated with a physical device, replace the target physical address with a real physical address of the target in the data packet; and
send the data packet with the real physical address of the target.

19. A storage device per claim 15, wherein, when the source address is determined to be associated with a threat, the instructions, when executed, further cause the storage device to:
determine whether the source address is located within the network;
generate an address control reply packet using a false physical address;
send the address control reply packet to a default gateway when the source address is not located within the network; and
send the address control reply packet to the source address when the source address is located within the network.

* * * * *